(12) United States Patent
Fujimoto et al.

(10) Patent No.: US 7,253,536 B2
(45) Date of Patent: Aug. 7, 2007

(54) WATER SUPPLY APPARATUS

(75) Inventors: Hidefumi Fujimoto, Kitakyushu (JP); Naoyuki Onodera, Kitakyushu (JP); Kimihiro Nakayama, Kitakyushu (JP); Makoto Hatakeyama, Kitakyushu (JP); Kazuyuki Enomoto, Kitakyushu (JP); Yukihiro Kudoh, Kitakyushu (JP); Tatsuhiro Kuga, Kitakyushu (JP); Satoshi Ishimaru, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 0 days.

(21) Appl. No.: 10/551,214

(22) PCT Filed: Mar. 29, 2004

(86) PCT No.: PCT/JP2004/004479

§ 371 (c)(1),
(2), (4) Date: Sep. 28, 2005

(87) PCT Pub. No.: WO2004/088127

PCT Pub. Date: Oct. 14, 2004

(65) Prior Publication Data

US 2006/0198728 A1    Sep. 7, 2006

(30) Foreign Application Priority Data

Mar. 28, 2003  (JP)  ............................. 2003-089897
Mar. 28, 2003  (JP)  ............................. 2003-089898

(51) Int. Cl.
*F03B 13/00*  (2006.01)
*F03B 13/10*  (2006.01)
*H02P 9/04*  (2006.01)

(52) U.S. Cl. .......................................... 290/43; 290/54

(58) Field of Classification Search .................. 290/43, 290/54
See application file for complete search history.

(56) References Cited

U.S. PATENT DOCUMENTS 4,246,753 A  *  1/1981  Redmond  ..................... 60/398

(Continued)

FOREIGN PATENT DOCUMENTS

JP           55-32985           3/1980

(Continued)

*Primary Examiner*—Darren Schuberg
*Assistant Examiner*—Pedro J. Cuevas
(74) *Attorney, Agent, or Firm*—Jordan and Hamburg LLP

(57) ABSTRACT

A water supply apparatus includes an apparatus body disposed in a flow passage for sucking water to an indoor facility and a power generation unit installed in the apparatus body. Further, the power generation unit further comprises a rotating shaft extended in a direction perpendicular to the water channel direction of the flow passage, and impeller installed on the rotating shaft and rotated by a water flow, a magnet rotated interlockingly with the impeller, and a coil arranged oppositely to the magnet, wherein the impeller forms blades in the radial outer direction and forms clearances allowing water to pass to the inside of the blades. Since the clearances are formed between the blades and the rotating shaft such a trouble that water flowing into the base ends of the blades obstructs the rotation of the impeller can be eliminated to increase a power generation amount by the power generation unit. In addition, since there is no need to expand the flow passage on the outside of the impeller to reduce the rotational resistance of the impeller, the size of the water supply apparatus can be reduced.

17 Claims, 14 Drawing Sheets

U.S. PATENT DOCUMENTS

| | | | |
|---|---|---|---|
| 4,467,217 A * | 8/1984 | Roussey | 290/54 |
| 4,731,545 A * | 3/1988 | Lerner et al. | 290/54 |
| 4,923,368 A * | 5/1990 | Martin | 415/202 |
| 4,963,780 A * | 10/1990 | Hochstrasser | 310/104 |
| 5,040,945 A * | 8/1991 | Levesque | 415/124.1 |
| 5,043,592 A * | 8/1991 | Hochstrasser | 290/52 |
| 5,100,290 A * | 3/1992 | Berger | 415/60 |
| 5,140,254 A * | 8/1992 | Katzman | 322/35 |
| 5,263,814 A * | 11/1993 | Jang | 415/63 |
| 5,626,461 A * | 5/1997 | Rose | 415/206 |
| 5,839,508 A * | 11/1998 | Tubel et al. | 166/65.1 |
| 6,036,333 A * | 3/2000 | Spiller | 362/192 |
| 6,309,179 B1 * | 10/2001 | Holden | 415/202 |
| 6,798,080 B1 * | 9/2004 | Baarman et al. | 290/43 |
| 6,885,114 B2 * | 4/2005 | Baarman et al. | 290/43 |
| 6,927,501 B2 * | 8/2005 | Baarman et al. | 290/43 |
| 7,067,936 B2 * | 6/2006 | Baarman et al. | 290/43 |
| 7,119,451 B2 * | 10/2006 | Baarman et al. | 290/43 |
| 2002/0041100 A1 * | 4/2002 | Yumita et al. | 290/52 |
| 2002/0047374 A1 * | 4/2002 | Yumita | 310/81 |
| 2002/0113442 A1 * | 8/2002 | Yumita | 290/54 |
| 2003/0147238 A1 * | 8/2003 | Allen et al. | 362/192 |
| 2004/0195840 A1 * | 10/2004 | Baarman et al. | 290/43 |
| 2005/0077732 A1 * | 4/2005 | Baarman et al. | 290/54 |
| 2005/0189769 A1 * | 9/2005 | Baarman et al. | 290/43 |
| 2005/0189770 A1 * | 9/2005 | Baarman et al. | 290/43 |

FOREIGN PATENT DOCUMENTS

| | | |
|---|---|---|
| JP | 59-217074 | 12/1984 |
| JP | 4-1673 | 1/1992 |
| JP | 2000-027262 | 1/2000 |
| JP | 2001-182646 | 7/2001 |
| JP | 2002-235651 | 8/2002 |
| JP | 2002-266742 | 9/2002 |

* cited by examiner (a)

(b)

WATER SUPPLY APPARATUS

TECHNICAL FIELD

The present invention relates to a water supply apparatus which installs a power generating unit in a midst of a flow passage which supplies water to an indoor facility. Here, the indoor facility indicates a water-related facility such as a sink, a wash basin, a toilet bowl, a washing machine or the like which are used in public facilities such as offices and stations and residences and is also a facility which uses service water, intermediate water, sewage, well water, rains and the like.

BACKGROUND ART

Conventionally, a water supply apparatus which installs a power generating unit in a midst of a flow passage for supplying water to an indoor facility has been popularly used. In such a water supply apparatus, the power generating unit generates an electric power by making use of a water flow in the inside of the flow passage and various electronic equipment such as sensors and switches which are mounted inside or outside the water supply apparatus are driven using the generated electricity.

For example, in an automatic water supply apparatus disclosed in Japanese Patent Laid-open Publication Sho59 (1984)-217074, a flow passage is formed in the inside of an apparatus body, a rotary shaft whose rotating axis extends in the direction orthogonal to the direction of a water flow is rotatably provided in a midst of the flow passage, and blades are formed on an outer periphery of the rotary shaft in a state that the blades extend in the radial direction.

Further, the rotary shaft is rotated together with the blades due to the water flow and electric power is generated due to the rotation of the rotary shaft.

Further, in a sterilizer of toilet boll flushing water disclosed in Japanese Patent Laid-open Publication 2000-27262, a flow passage is formed in the inside of an apparatus body, a rotary shaft whose rotating axis extends in the direction orthogonal to the direction of a water flow is rotatably provided in a midst of the flow passage, and blades are formed on an outer periphery of the rotary shaft in a state that the blades extend in the radial direction, and a power generator is connected to the rotary shaft.

Further, the rotary shaft is rotated together with the blades due to the water flow and electric power is generated due to the rotation of the rotary shaft.

However, in the conventional apparatus, the rotary shaft whose rotating axis extends in the direction orthogonal to the direction of the water flow is rotatably provided in the midst of the flow passage, and the blades are formed on the outer periphery of the rotary shaft in a state that the blades extend in the radial direction. That is, in the conventional apparatus, no clearances are formed between the rotary shaft and the blades.

Accordingly, water which impinges on distal end portions of the blades flows not only toward the outside than the distal ends of the blades but also toward proximal end portions of the blades. Here, water which flows toward the proximal end portions of the blades exhibits a trivial action to rotate the blades and rather exhibits an action which functions as the resistance against the rotation of the blades. That is, water which flows toward the proximal end portions of the blades impedes the rotation of the blades thus giving rise to a loss of amount of power generated by a power generator.

Further, the conventional apparatus adopts the structure in which the rotating shaft is mounted on the apparatus body and does not adopt the structure which allows the detachable mounting of the power generating unit on the apparatus body and hence, an operation to assemble a power generating mechanism such as the rotary shaft and the blades to the apparatus body becomes cumbersome and, at the same time, the maintenance operation of the power generating mechanism also becomes cumbersome.

DISCLOSURE OF THE INVENTION

In view of the above-mentioned circumstances, according to the present invention, in a water supply apparatus in which an apparatus body is disposed in a midst portion of a flow passage for supplying water to an indoor facility and a power generating unit is installed in the apparatus body, the power generating unit includes a rotating shaft extended in the direction orthogonal to the water flow direction of the flow passage, an impeller mounted on the rotating shaft and rotated by a water flow, a holder having a cylindrical portion with an arcuate cross section along the impeller and having a shaft support portion which supports a proximal end portion of the rotary shaft on a distal end of the cylindrical portion, a magnet rotated interlockingly with the impeller, and a coil arranged to face the magnet in the opposed manner, wherein the holder in the power generating unit is mounted on a peripheral surface of an opening portion formed in the apparatus body in a state that shaft support portion is inserted into the inside of the flow passage from the opening portion. and the impeller forms blades in the outward radial direction and forms clearances allowing water to pass the inside of the blades.

Further, according to the present invention, the holder in the power generating unit is supported in a state that the distal end portion is fitted in an inner surface of the apparatus body which faces the opening portion of the apparatus body in an opposed manner.

Further, according to the present invention, in the above-mentioned power generating unit, the magnet is disposed inside the flow passage and the coil is disposed outside the flow passage in a hermetically partitioned manner from the flow passage.

Further, according to the present invention, the above-mentioned power generating unit includes intrusion suppression means which suppresses the intrusion of foreign substances between the blades and the magnet.

Further, according to the present invention, the above-mentioned intrusion suppression means is constituted by forming spear-headed thread-like grooves capable of generating a water flow which pushes back the foreign substance to the blade side due to the rotation of the impeller on an outer periphery of the impeller.

Further, according to the present invention, the power generating unit arranges the above-mentioned rotating shaft on a center axis of the flow passage.

Further, according to the present invention, clearances are formed between outer peripheries of the blades and an inner wall of the above-mentioned flow passage in a state that the clearances are arranged asymmetrical with respect to an axis of the rotating shaft.

Further, according to the present invention, a guide member which guides water toward the above-mentioned impeller is formed above the cylindrical portion.

Further, according to the present invention, a second guide member which guides water toward the above-mentioned impeller is arranged at a position where the second guide member faces the guide member in an opposed manner with the rotary shaft sandwiched therebetween.

BEST MODE FOR CARRYING OUT THE INVENTION

Hereinafter, the specific structure of the water supply apparatus according to the present invention is explained in conjunction with attached drawings.

(Toilet Bowl Flushing Apparatus)

Figure 1:
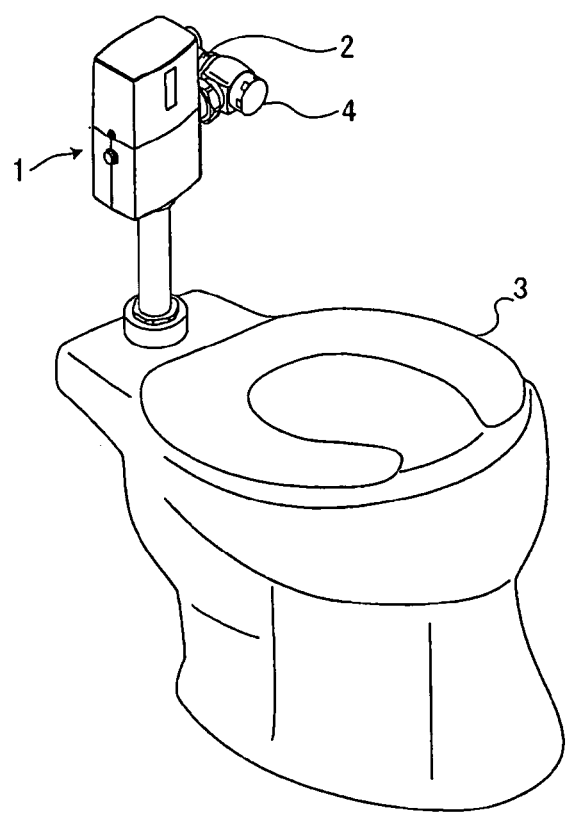
FIG. 1 is a perspective view showing a connection state of a toilet bowl flushing apparatus which constitutes a water supply apparatus of the present invention.

FIG. 1 shows a toilet bowl flushing apparatus 1 which constitutes a water supply apparatus according to the present invention.

Figure 11:
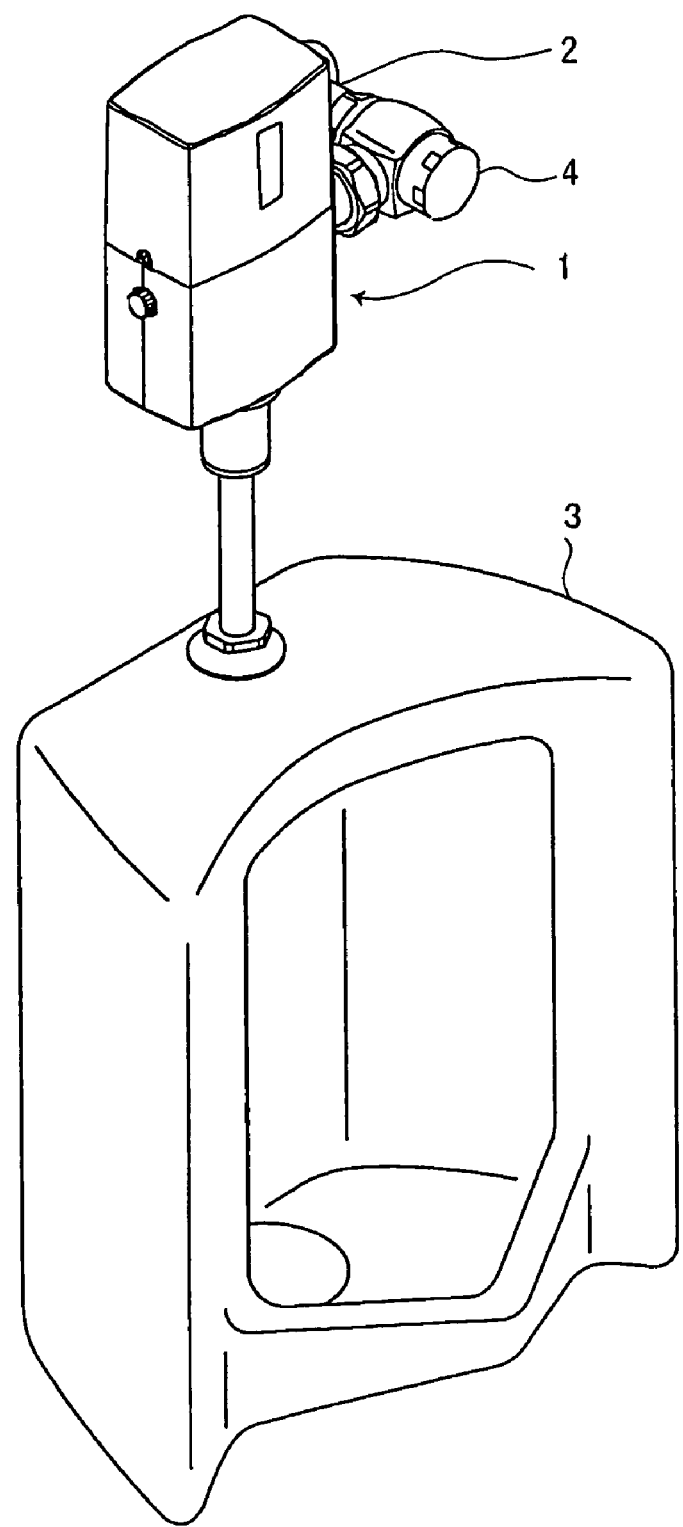
FIG. 11 is a perspective view showing another connection mode of the toilet bowl flushing apparatus.

The toilet bowl flushing apparatus 1 is, as shown in FIG. 1, interposed between a water supply pipe 2 and a toilet bowl 3 and is served for supplying water supplied from a water supply pipe 2 to the toilet bowl 3. In the drawing, numeral 4 indicates a water stop valve. Here, the toilet bowl 3 may be a waste bowl shown in FIG. 1 or a urine bowl shown in FIG. 11.

Figure 2:
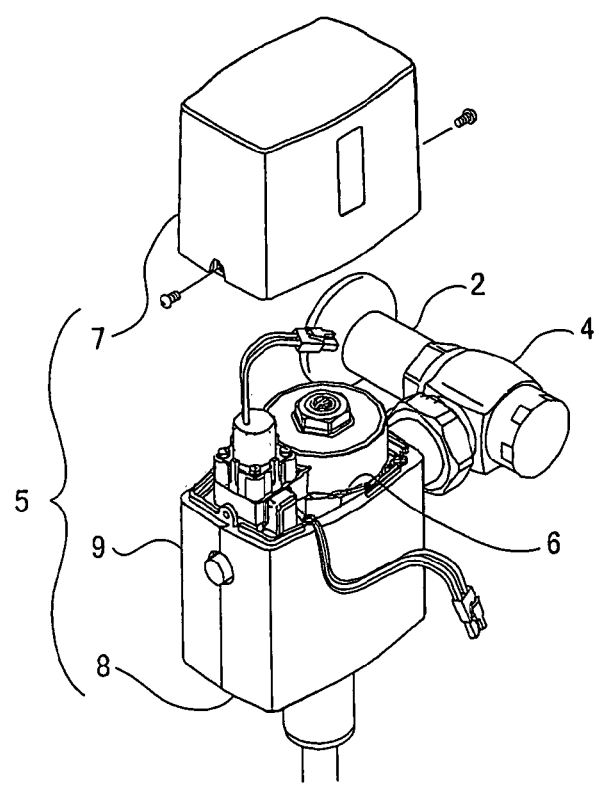
FIG. 2 is an exploded perspective view showing the toilet bowl flushing apparatus.
Figure 3:
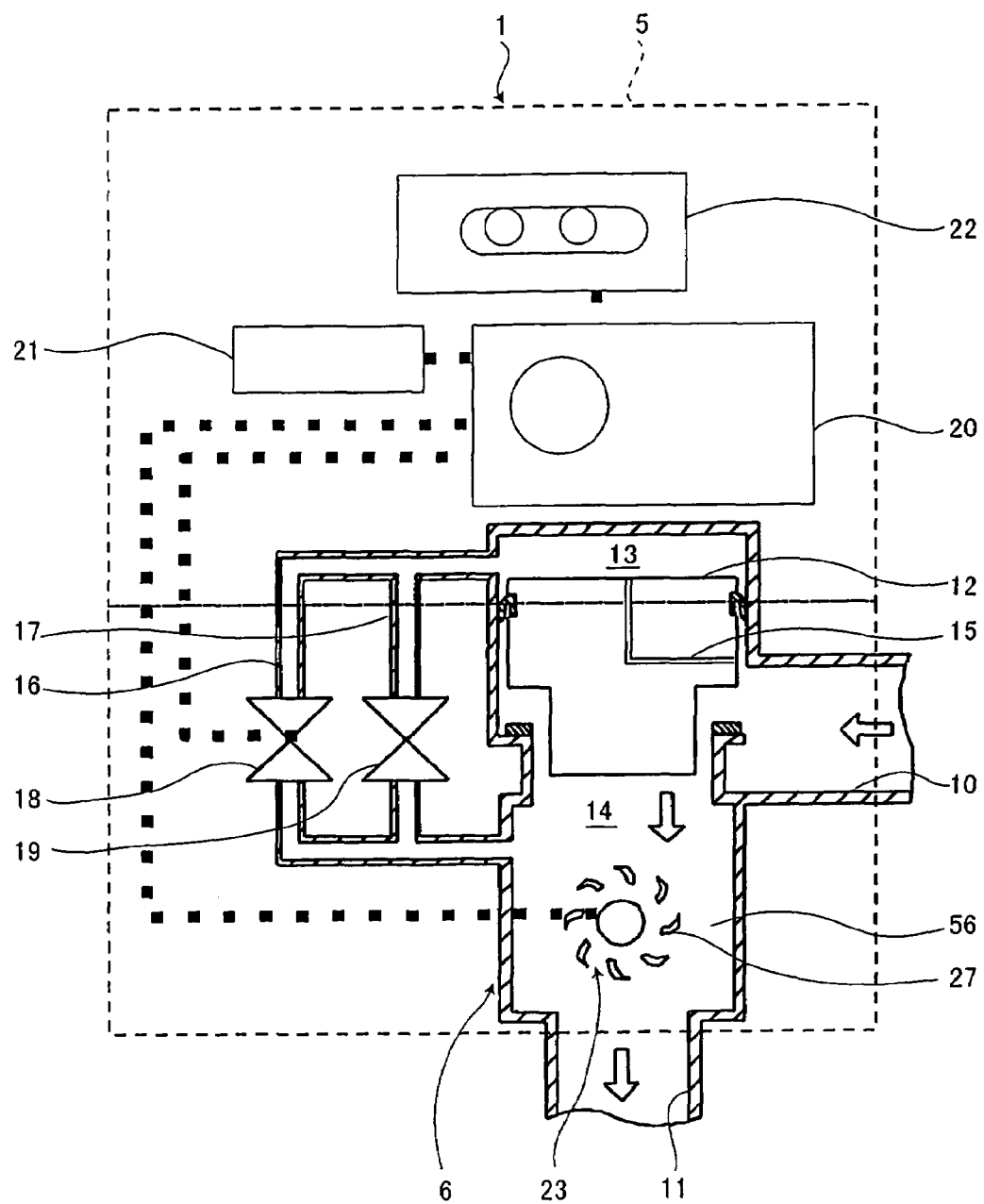
FIG. 3 is a schematic view showing the toilet bowl flushing apparatus.

In the toilet bowl flushing apparatus 1, as shown in FIG. 2, a apparatus body 6 is disposed in the inside of a casing 5.

Figure 4:
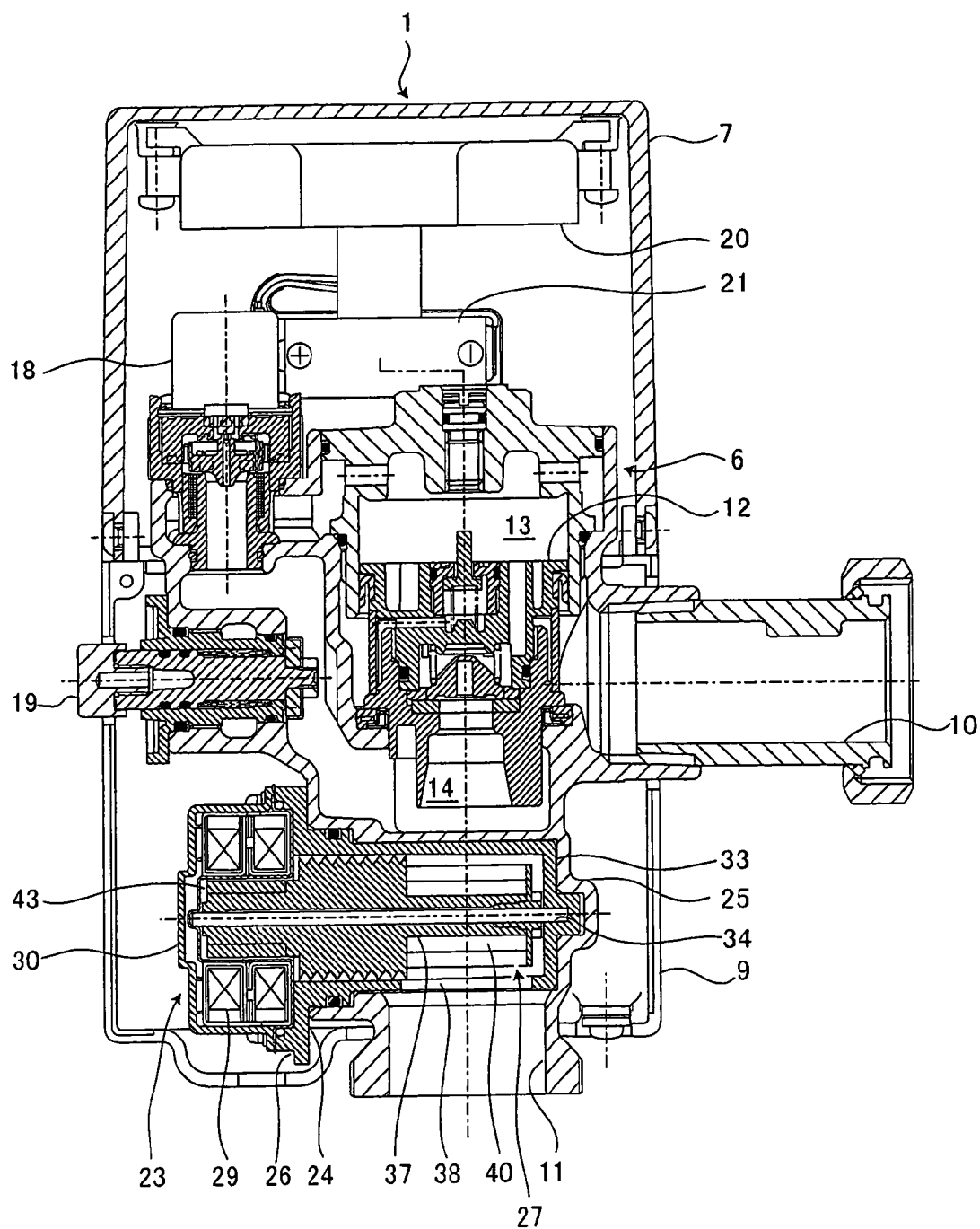
FIG. 4 is a front cross-sectional view showing the toilet bowl flushing apparatus.
Figure 5:
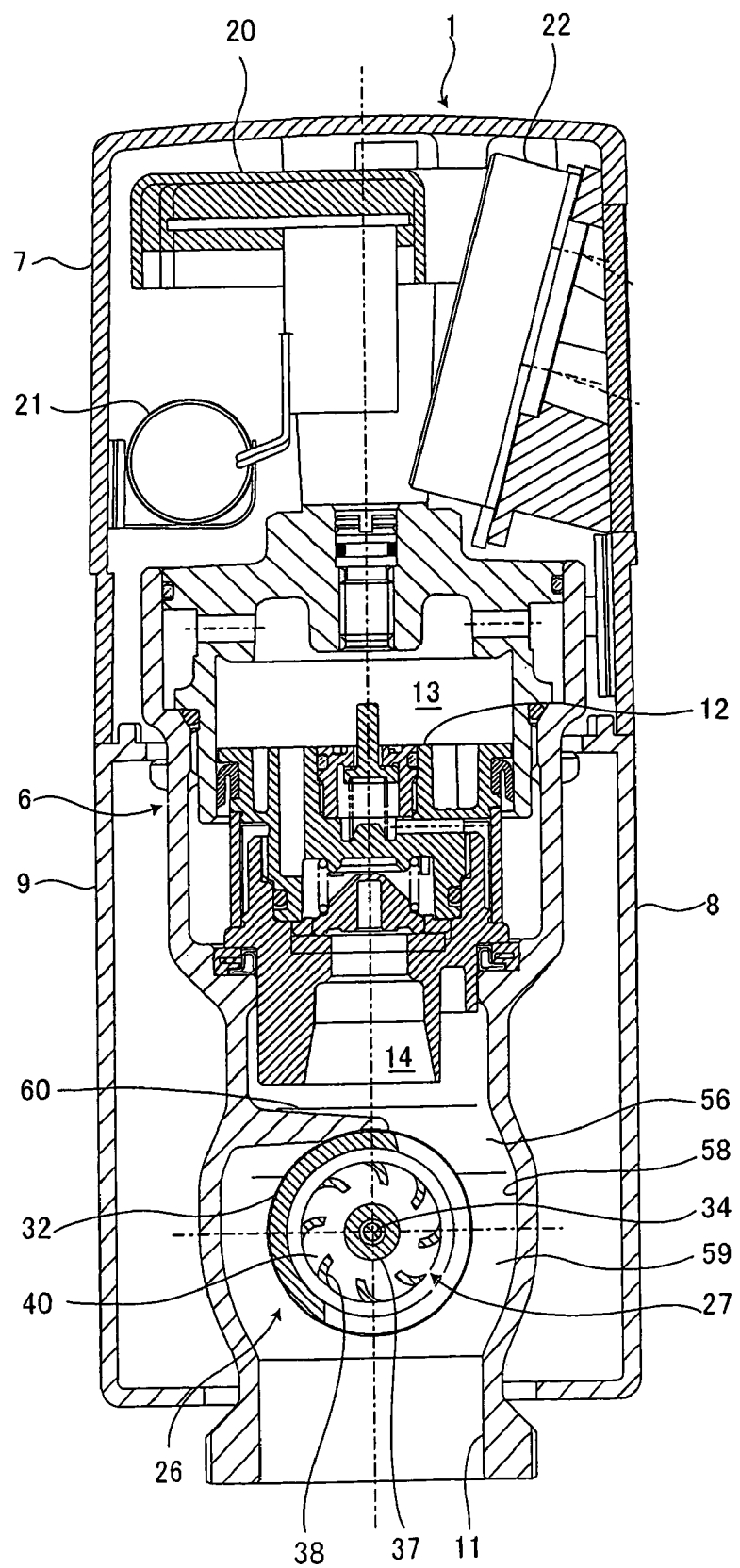
FIG. 5 is a side cross-sectional view showing the toilet bowl flushing apparatus.

As shown in FIG. 2, FIG. 4 and FIG. 5, the casing 5 has the split structure and is constituted of an upper cover 7 which covers an upper portion of the apparatus body 6, a front cover 8 which covers a lower portion of a front side of the apparatus body 6, and a rear cover 9 which covers a lower portion of a rear side of the apparatus body 6.

In the apparatus body 6, as shown in FIG. 2 to FIG. 6, while a cylindrical water inlet 10 which is communicably connected with the water supply pipe 2 is formed on an upper right side portion thereof, a cylindrical water outlet 11 which is communicably connected with the toilet bowl 3 is formed on a lower portion thereof.

Further, in the apparatus body 6, an open/close valve 12 is disposed on a downstream side of the water inlet 10 and, at the same time, a back pressure chamber 13 is formed in an upper portion of the open/close valve 12. Further, a secondary-side water passage 14 is formed below the open/close valve 12.

The water inlet 10 is communicably connected with the back pressure chamber 13 by way of a communication passage 15 which is formed in the inside of the open/close valve 12. The back pressure chamber 13 is communicably connected with the secondary-side water passage 14 by way of first and second bypass flow passages 16, 17. An electromagnetic valve 18 is disposed in a midst portion of the first bypass flow passage 16 and a manually operable valve 19 is disposed in a midst portion of the second bypass flow passage 17.

The electromagnetic valve 18 is connected with a control unit 20 which is mounted on an upper portion of an inside of the casing 5.

To the control unit 20, besides the electromagnetic valve 18, a battery 21, a human body detection sensor 22 and a power generating unit 23 described later are connected. Further, in the control unit 20, charging means into which electric energy generated by a power generating unit 23 is charged is incorporated, and the electric energy is supplied to respective portions of the toilet bowl flushing apparatus 1 from the charging means. On the other hand, when the generation of power is not performed by the power generating unit 23 at the time of starting the toilet bowl flushing apparatus 1 and for a long period, the electric energy is supplied to the above-mentioned charging means from the battery 21.

The apparatus body 6 has the above-mentioned constitution and supplies water for flushing to the toilet bowl 3 as explained hereinafter.

First of all, in a state that the electromagnetic valve 18 and the manually operable valve 19 are closed, water which is supplied from the water supply pipe 2 flows in the back pressure chamber 13 from the water inlet 10 by way of the communication passage 15 and hence, the pressure inside the back pressure chamber 13 becomes higher than the pressure inside the secondary-side water passage 14 due to the water pressure whereby the open/close valve 12 is closed.

Further, when the electromagnetic valve 18 is released upon receiving a control signal from the control unit 20, water flows in the secondary-side water passage 14 from the back pressure chamber 13 by way of the first bypass flow passage 16 and hence, the pressure difference between the secondary-side water passage 14 and the back pressure chamber 13 is instantly reduced. Along with the reduction of pressure difference, the open/close valve 12 is moved to the upper back pressure chamber 13 side and hence, the water inlet 10 and the secondary-side water passage 14 are communicated with each other whereby a water flows in the secondary-side water passage 14 from the water inlet 10 due to the water pressure and, further, water is supplied to the toilet bowl 3 from the water outlet 11.

Here, also when the manually operable valve 19 is released by the manual operation, in the same manner, water flows in the secondary-side water passage 14 from the back pressure chamber 13 by way of the second bypass flow passage 17 and hence, the pressure difference between the secondary-side water passage 14 and the backpressure chamber 13 is instantly reduced. Along with the reduction of pressure difference, the open/close valve 12 is moved to the upper back pressure chamber 13 side and hence, the water inlet 10 and the secondary-side water passage 14 are communicated with each other whereby the water flows in the secondary-side water passage 14 from the water inlet 10 due to the water pressure and, further, the water is supplied to the toilet bowl 3 from the water outlet 11.

The apparatus body 6 includes a power generating unit 23 which generates electric power by making use of water which flows in the secondary-side water passage 14.

Figure 6:
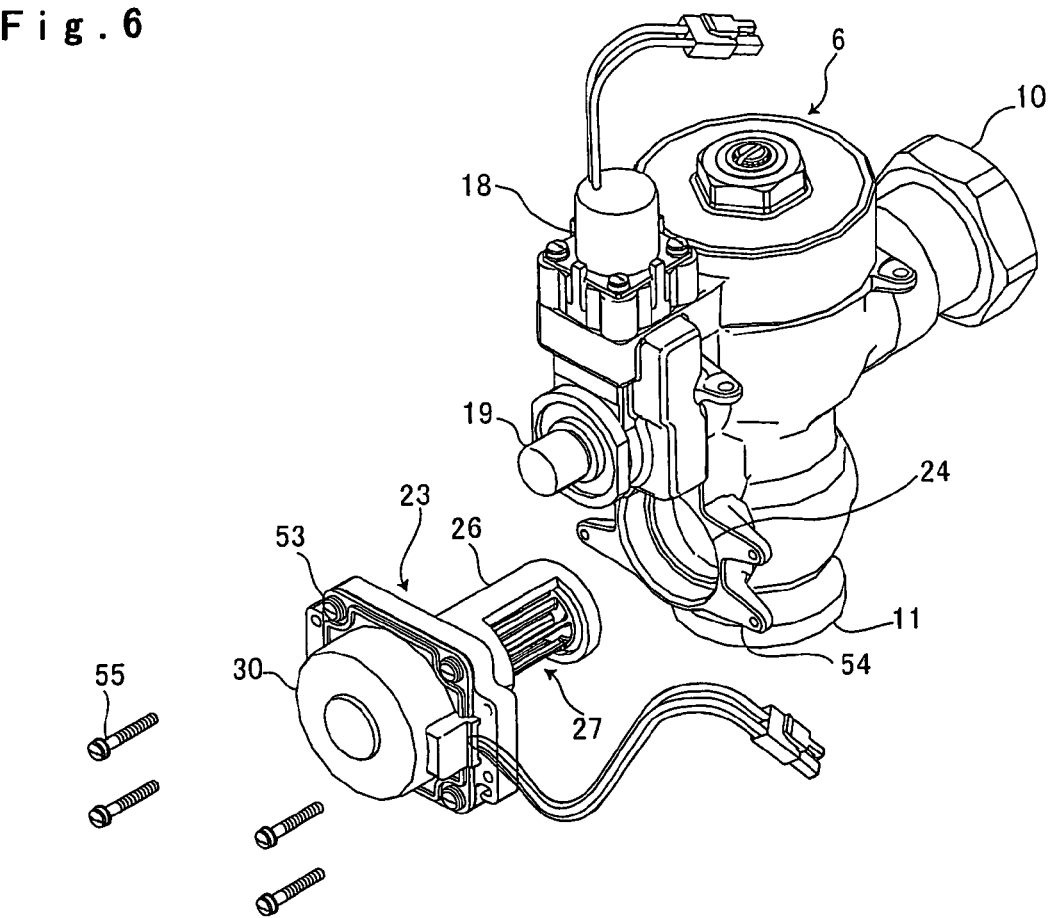
FIG. 6 is an exploded perspective view showing an apparatus body and a power generating unit.
Figure 7:
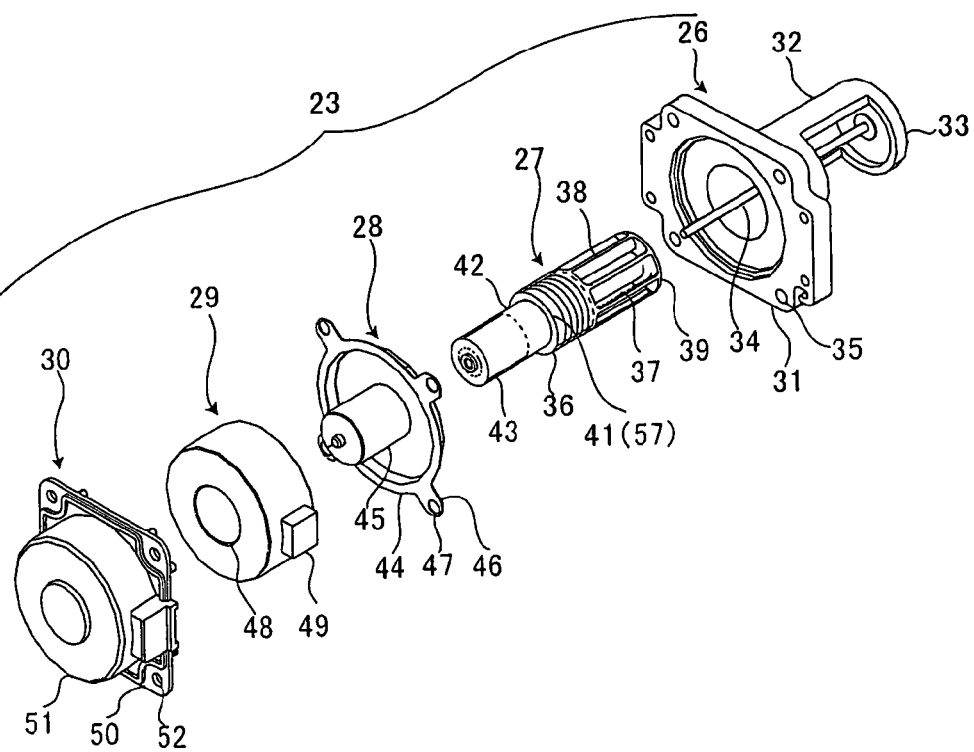
FIG. 7 is an exploded perspective view showing the power generating unit.

That is, the apparatus body 6 forms, as shown in FIG. 4 to FIG. 6, a circular opening portion 24 in a lower left side portion thereof and a support recessed portion 25 in an inner wall thereof which faces the opening portion 24 in an opposed manner. A distal end portion of the power generating unit 23 which is inserted from the opening portion 24 is supported on the support recessed portion 25 and, at the same time, a midst portion of the power generating unit 23 is supported on the opening portion 24.

The power generating unit 23, as shown in FIG. 4 to FIG. 7, is constituted of a holder 26, an impeller 27, an intermediate cover 28, a coil 29 and a cover 30 in a separable manner.

The holder 26 forms a cylindrical portion 32 having an arcuate cross section on an approximately rectangular-shaped flange 31, an approximately disc-shaped shaft support portion 33 is formed on a distal end of the cylindrical portion 32, a proximal end portion of a rotating shaft 34 is mounted on a center of the shaft support portion 33. In the drawing, numeral 35 indicates bolt holes.

Further, the holder 26 mounts an approximately cylindrical shaped impeller 27 on a rotating shaft 34 thereof in a rotatable manner.

The impeller 27 mounts a rotating cylindrical portion 37 on a distal end side of a circular cylindrical portion 36 thereof having a circular cross section in a projecting manner, wherein a diameter of the rotating cylindrical portion 37 is set smaller than a diameter of the cylindrical portion 36. Further, eight curved blades 38 are formed on a distal end side of the cylindrical portion 36 in a state that the curved blades 38 extend in the radial outer direction and are also spaced apart from an outer peripheral surface of the rotating cylindrical portion 37. A disc-shaped end plate 39 is formed on distal ends of the rotating cylindrical portion 37 and the blades 38.

By forming a space between the outer peripheral surface of the rotating cylindrical portion 37 and inner end portions of the blades 38, the impeller 27 forms clearances 40 which allow water to pass therethrough inside the blades 38.

Further, the impeller 27 forms spiral-shaped grooves 41 having the spiral direction opposite to the rotating direction of the impeller 27 on the outer peripheral surface of the cylindrical portion 36. Further, on the proximal end side of a cylindrical portion 36, the impeller 27 mounts a circular supporting cylindrical portion 42 having a diameter smaller than a diameter of cylindrical portion 36 is mounted in a projecting manner. A cylindrical magnet 43 having a circular cross section is mounted on the supporting cylindrical portion 42.

The magnet 43 alternatively and continuously forms north poles and south poles on an outer peripheral portion thereof.

Further, in the impeller 27, the magnet 43 is rotatably engaged in the intermediate cover 28.

The intermediate cover 28 forms a cylindrical portion 45 on a center portion of an annular disc portion 44, wherein the magnet 43 is engaged in the cylindrical portion 45. A distal end portion of the rotary shaft 34 is supported on a center portion of the distal end of the cylindrical portion 45. In the drawing, numeral 46 indicates tongues which are formed on an outer periphery of the annular disc portion 44 and numeral 47 indicates through holes formed in the tongues 46.

Further, with respect to the intermediate cover 28, a coil 29 is engaged on an outer peripheral portion of the cylindrical portion 45.

The coil 29 is formed annularly, wherein the cylindrical portion 45 of the intermediate cover 28 is engaged in the center through hole 48 of the coil 29 and an output terminal 49 is formed on an outer portion of the coil 29.

The coil 29 is hermetically covered with the intermediate cover 28 and the cover 30.

The cover 30 forms a cylindrical portion 51 on a center of an approximately rectangular flange portion 50 and the coil 29 is engaged in the cylindrical portion 51. In the drawing, numeral 52 indicates through holes.

The cover 30 is mounted on a flange 31 of the holder 26 together with the intermediate cover 28 using bolts 53.

The power generating unit 23 having such a constitution is inserted into the apparatus body from the opening portion 24 formed in the apparatus body 6, a distal end portion of the power generating unit 23 is supported on the inside of the apparatus body 6, and the flange 31 of the holder 26 is detachably mounted on a flange 54 formed on an outer peripheral portion of the opening 24 using bolts 55.

Due to such a constitution, the power generating unit 23 can be easily mounted or dismounted from the apparatus body 6 and hence, the assembling property of the toilet bowl flushing apparatus can be enhanced and, at the same time, the maintenance property of the power generating unit 23 can be enhanced.

Further, since the distal end portion of the power generating unit 23 is supported in the inside of the apparatus body 6, it is possible to assemble the power generating unit 23 to the apparatus body 6 in a stable manner whereby the rotating shaft 34 can be accurately arranged in place in the flow passage of the apparatus body 6.

Further, in a state that the power generating unit 23 is mounted on the apparatus body 6, the rotating shaft 34 extends in the direction orthogonal to the direction of water flow in the flow passage 56 formed in the inside of the apparatus body 6, the impeller 27 which is driven by the water flow is mounted on the rotating shaft 34, and the coil 29 is arranged at a position where the coil 29 faces the magnet 43 which is integrally rotated in an interlocking manner with the impeller 27.

Due to such a constitution, in the power generating unit 23, water which flows in the flow passage 56 impinges on the distal end portions of the blades 38 of the impeller 27 so as to rotate the impeller 27, and the magnet 43 is interlockingly rotated whereby the power generation is performed due to a cooperative action of the magnet 43 and the coil 29.

Further, in such an operation, water which impinges on the distal end portions of the blades 38, thereafter, flows not only toward the outside than the distal end of the blades 38 but also toward the proximal end portion of the blades 38. However, water which flows into the proximal end portion of the blades 38 passes through the clearance 40 which is formed in the inner portions of the blades 38 in a state that the clearance 40 allows water to pass therethrough and is smoothly discharged from the impeller 27.

Accordingly, the possibility that water which flows toward the proximal end portions of the blades 38 obstructs the rotation of the impeller 27 can be eliminated and hence, the power generation amount due to the power generating unit 23 can be increased. Further, the increase of pressure loss in the apparatus body 6 attributed to the insertion of the power generating unit 23 can be reduced and hence, it is unnecessary to expand the flow passage 56 outside the impeller 27 where by toilet bowl flushing device 1 can be miniaturized.

Figure 8:
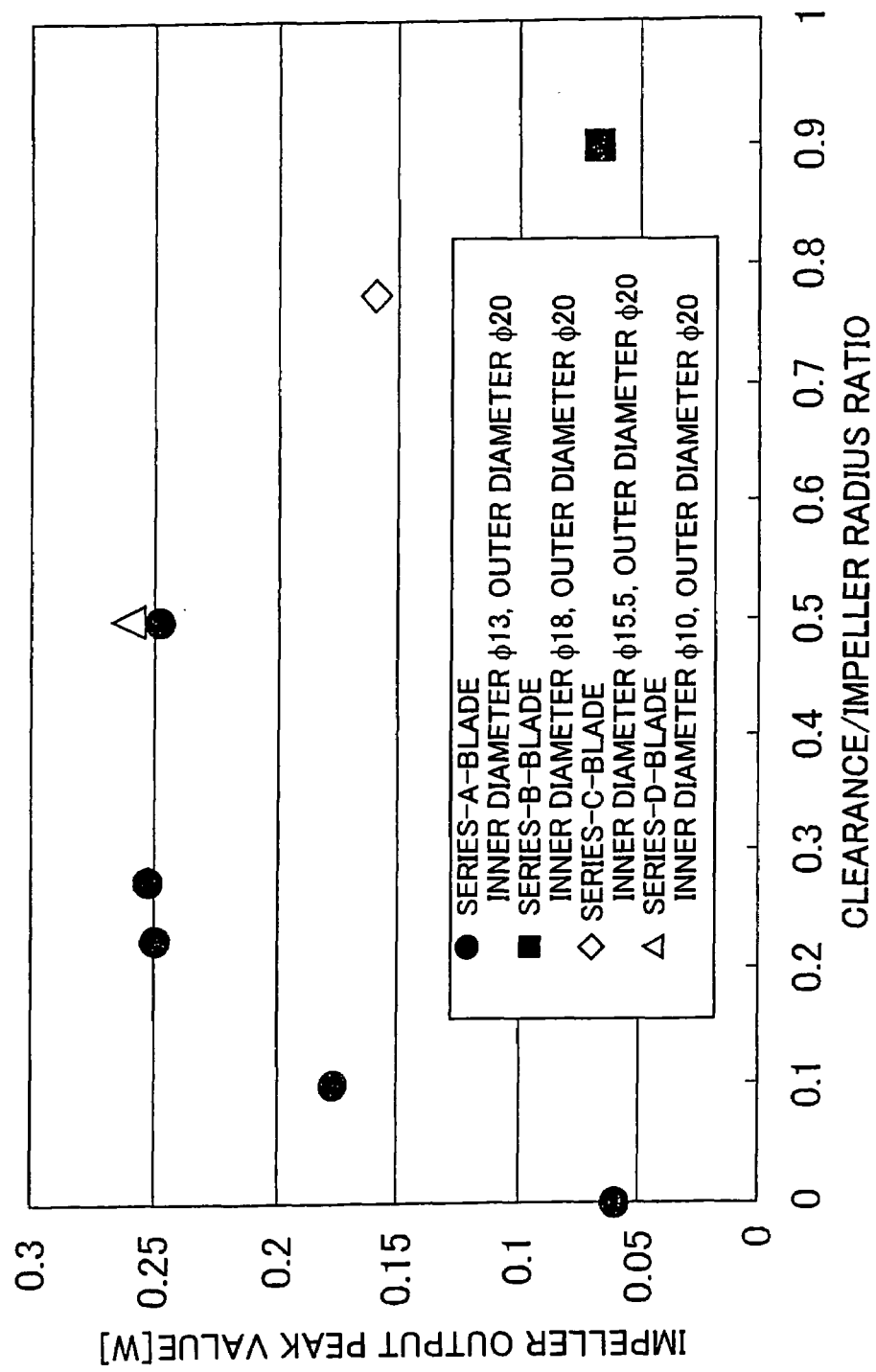
FIG. 8 is a graph showing the change of an output peak value of an impeller.

It is preferable to form the clearance 40 such that a ratio (width/radius) between a width of the clearance 40 and a radius of the impeller 27 falls within a range of 0.1 to 0.8. It is more preferable to form the clearance 40 such that the ratio falls within a range of 0.2 to 0.5. This is because that, as shown in FIG. 8, when the ratio between the width of the clearance 40 and the radius of the impeller 27 falls within a range of 0.2 to 0.5, an output attributed to the impeller 27 substantially reaches a peak and hence, it is possible to approximate the power generation amount by the power generating unit 23 to a maximum value. Further, when the ratio between the width of the clearance 40 and the radius of the impeller 27 falls within a range of 0.1 to 0.8, it is possible to ensure one half of the maximum value (0.25W) or more as the output attributed to the impeller 27.

Here, FIG. 8 shows a result when water flows at a flow rate of 11L/min. In series A, the clearance between the rotating cylindrical portion 37 and the blades 38 is changed by changing the diameter of the rotating cylindrical portion 37 while fixing an outer blade diameter of the blades 38 to 20 mm and an inner diameter of the blades 38 to 13 mm. Further, in series B to D, the clearance between the rotating cylindrical portion 37 and the blades 38 is changed by changing the inner diameter of the blades 38 within a range of 10 mm to 18 mm. Further, peak values which exhibit the highest outputs when the rotational speed is changed by changing a load applied to the rotational shaft 34 are plotted. Here, in the series A to D, it is assumed that the blades 38 are formed of eight arcuate blades.

Further, in a state that the generating unit 23 is mounted on the apparatus body 6, the magnet 43 is arranged in the inside of the flow passage 56, while the coil 29 is arranged outside the flow passage 56 which is hermetically partitioned from the flow passage 56 by an intermediate cover 28.

Due to such a constitution, there is no possibility that the coil 29 is immersed in water and hence, it is possible to prevent erroneous operations and troubles of the power generating unit 23 attributed to the erosion and the short-circuiting of the coil 29.

Further, in the power generating unit 23, on an outer peripheral surface of the cylindrical portion 27 of the impeller 27, the grooves 41 which have a spiral shape so as to generate a water flow which pushes back foreign substances such as iron rusts toward the blade 38 side due to the rotation of the impeller 27 are formed. Due to such a constitution, it is possible to prevent the movement of the foreign substance such as the iron rusts from the flow passage 56 to the magnet 43. That is, by forming the grooves 41 between the blades 38 and the magnet 43, the power generating unit 23 forms the intrusion suppression means 57 which suppresses the intrusion of the foreign substance such as iron rusts between the blades 38 and the magnet 43.

Further, by forming the intrusion suppression means 57 into a threaded shape having spear-headed distal ends, it is possible to finely crush the foreign substance such as iron rusts which intrude into the intrusion suppression means 57 by a rotating force and hence, it is possible to prevent in advance a phenomenon that the rotation of the impeller 27 is stopped due to the clogging of the foreign substance in the intrusion suppression means 57.

In this manner, the power generating unit 23 includes the intrusion suppression means 57 which suppresses the intrusion of iron dusts or the like between the blades 38 and the magnet 43 and hence, it is possible to prevent the adhesion of the iron rusts or the like to the magnet 43. Further, due to the formation of the spear-headed distal ends on the intrusion suppression means 57, it is possible to suppress the clogging of the iron rust or the like in the intrusion suppression means 57 and hence, erroneous operations and troubles of the power generating unit 23 attributed to the adhesion of the impeller 27 can be prevented in advance.

Particularly, since the intrusion suppression means 57 is constituted of the grooves 41 which are spirally formed on the outer periphery of the impeller 27 in a state that the groove forming direction is opposite to the rotational direction of the impeller 27, it is possible to easily form the intrusion suppression means 57 between the blades 38 and the magnet 43 and hence, the power generating unit 23 can be designed compactly.

Further, in the toilet bowl flushing apparatus 1, the power generating unit 23 is arranged on a center line of the water inlet port 10 formed in the apparatus body 6 in a plan view in a state that the power generating unit 23 faces the water inlet port 10 in an opposed manner, and a rotating shaft 34 of the power generating unit 23 is arranged on a center line of the flow passage 59. Due to such a constitution, the projection amounts of the power generating unit 23 in the fore-and-aft directions with respect to the flow passage 59 are set equal. The flow passage 59 has the center line thereof aligned with the water inlet port 10 and the water outlet port 11 formed in the apparatus body 6. Further, the toilet bowl flushing apparatus 1 accommodates the water inlet port 10, the water outlet port 11 and the power generating unit 23 at the center in the fore-and-aft direction of the casing 5.

Accordingly, as shown in FIG. 9(a) and FIG. 9(b), even when the apparatus body 6 is reversed in the fore-and-aft direction, there is no change in the handling of the apparatus body 6 with respect to the water inlet port 10 and the water outlet port 11. Further, there is no possibility that the casing 5 which houses the apparatus body 6 projects in the frontward and rearward directions and hence, irrespective of the position of the water supply pipe 2 which is connected to the water inlet port 10, it is possible to favorably mount the power generating unit 23 on the apparatus body 6 whereby the installation property of the toilet bowl flushing device 1 can be enhanced.

Figure 9:
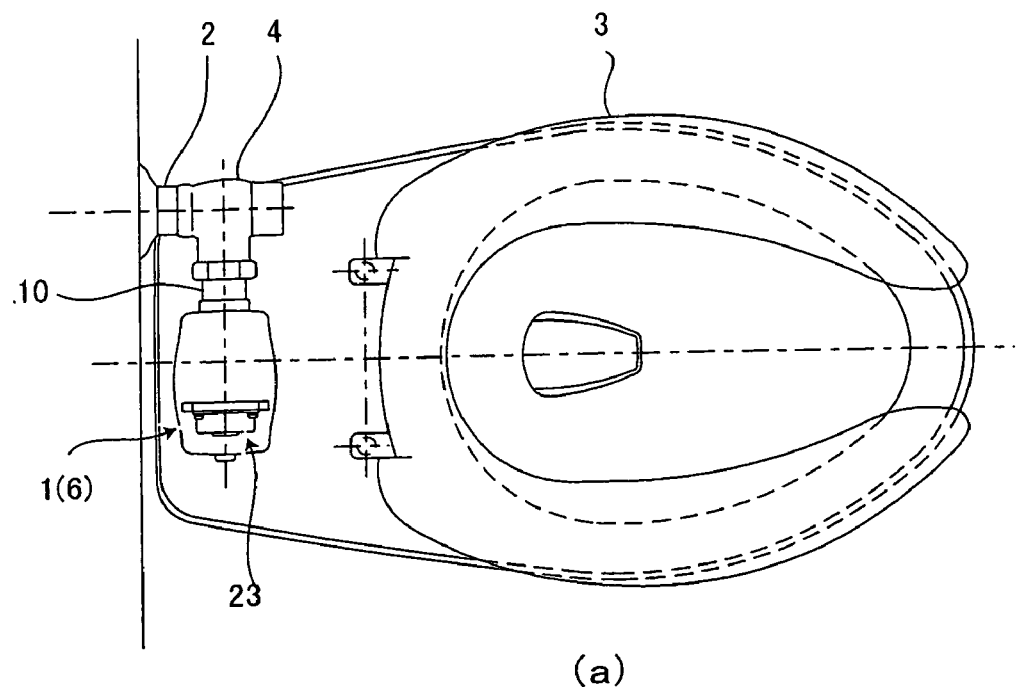
FIG. 9 is a plan view showing the connection state of the toilet bowl flushing apparatus.
Figure 9:
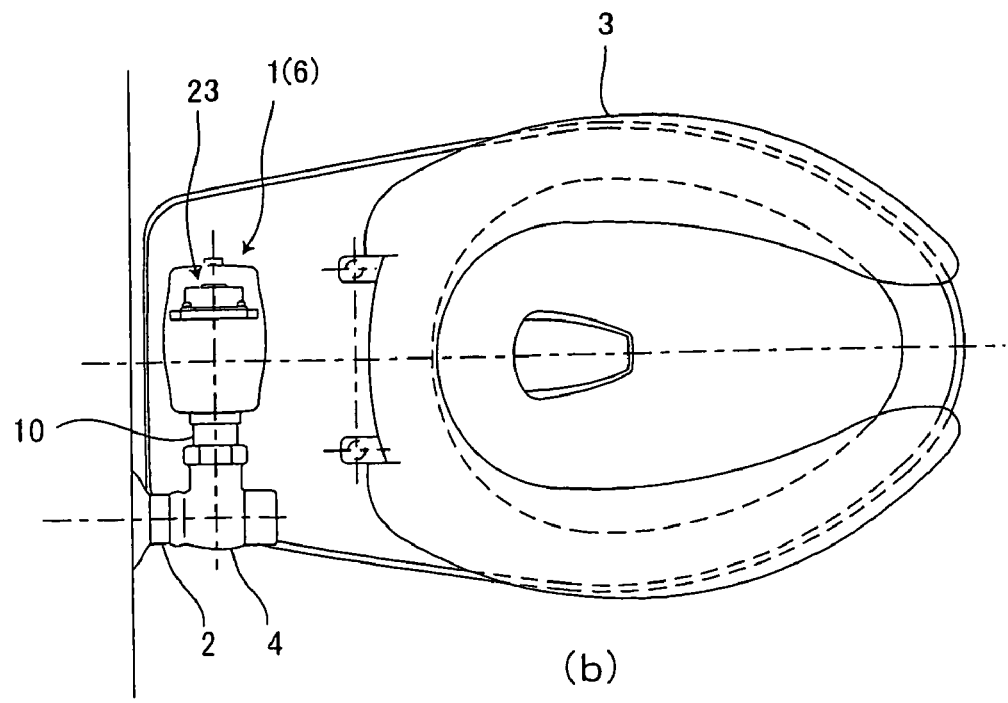

That is, as shown in FIG. 2 and FIG. 9, when the water supply pipe 2 is arranged on the right side of the toilet bowl flushing device 1, the apparatus body 6 is housed in the inside of the casing 5 in a state that the water inlet port 10 of the apparatus body 6 is directed to the right side and the water inlet port 10 and the water supply pipe 2 are connected to each other. On the other hand, when the water supply pipe 2 is arranged on the left side of the toilet bowl flushing device 1, the apparatus body 6 is housed in the inside of the casing 5 in a state that the water inlet port 10 of the apparatus body 6 is directed to the left side and the water inlet port 10 and the water supply pipe 2 are connected to each other. In this case, it is sufficient to mount the apparatus body 6 in a reverse manner such that the positional relationship between the front cover 8 and the rear cover 9 is reversed in the fore-and-aft direction while maintaining the upper cover 7 and the control unit 20 housed in the upper cover 7.

Further, with respect to the toilet bowl flushing device 1, as shown in FIG. 5, in a state that the power generating unit 23 is mounted on the apparatus body 6, a clearance 59 is formed between outer peripheries of the blades 38 and an inner wall 58 of the flow passage 59. This clearance 59 is larger than a clearance between the outer peripheries of the blades 38 and the cylindrical portion 32, thus forming a flow passage which does not receive the pressure loss attributed to the impeller 27.

Accordingly, the toilet bowl flushing device 1 allows the inflow of an amount of water sufficient to generate power to the impeller 27 and allows a portion of water which flows in the flow passage 56 to flow out through the clearance 59 between the outer peripheries of the blades 38 and the inner wall 58 of the flow passage 56 and hence, the pressure loss in the flow passage 56 can be suppressed.

Further, since the cylindrical portion 32 is formed along the outer peripheries of the blades 38, the power generating unit 23 can accurately regulate an amount or an inflow angle of water which rotates the impeller 27 by impingement on the blades 38 by changing the shape of the cylindrical portion 32 whereby it is possible to obtain the desired power generation amount using the power generating unit 23.

Further, in the toilet bowl flushing device 1, a guide member 60 which guides water toward the impeller 27 is formed inside the flow passage 56 of the apparatus body 6 and the guide member 60 is contiguously formed with the cylindrical portion 32 of the power generating unit 23.

Also due to such a constitution, it is possible to accurately regulate an amount of water which flows in the impeller 27 whereby it is possible to obtain the desired power generation amount using the power generating unit 23.

Figure 10:
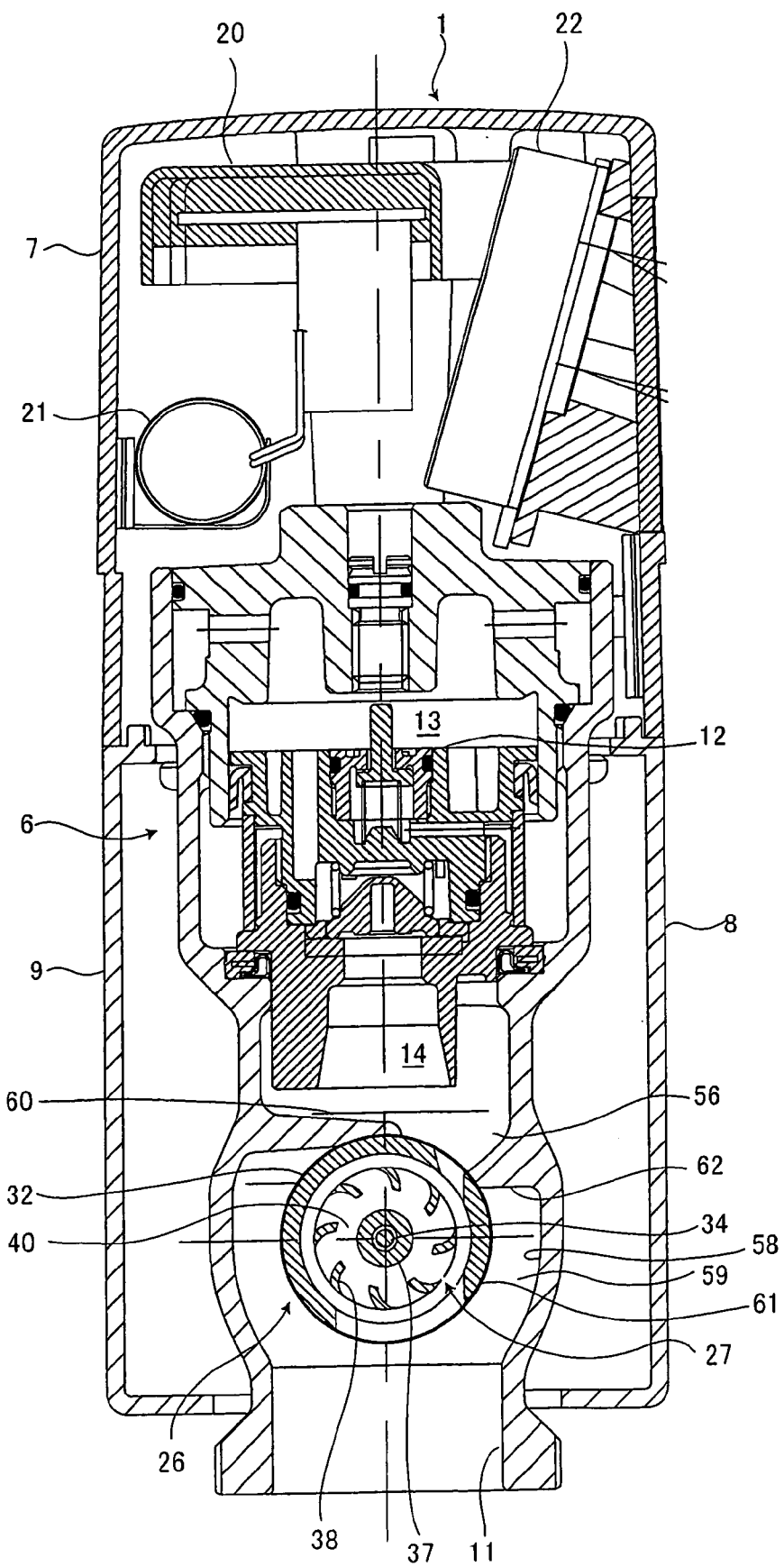
FIG. 10 is a front cross-sectional view showing another embodiment of the toilet bowl flushing apparatus.

Although cylindrical portion 32 and the guide member 60 are formed only on one side of the flow passage 56 as shown in FIG. 5, cylindrical portions 32 and guide members 60 may be formed on both sides of the flow passage 56 as shown in FIG. 10.

That is, in the toilet bowl flushing apparatus 1 shown in FIG. 10, a cylindrical portion 61 and a guide member 62 are formed at positions where the cylindrical portion 61 and the guide member 62 face the e cylindrical portion 32 and the guide member 60 with the rotating shaft 34 therebetween.

In this manner, by providing the guide members 60, 62 at the positions where the guide members 60, 62 face each other with the cylindrical portions 32, 61 and the rotating shaft 34 therebetween, the impeller 27 is rotated using water which flows through the clearance between the cylindrical portions 32, 61 and the guide members 60, 62 and hence, it is possible to surely generate power by the power generating unit with a small amount of water.

(Power Generating Unit for Indoor Facility)

Figure 12:
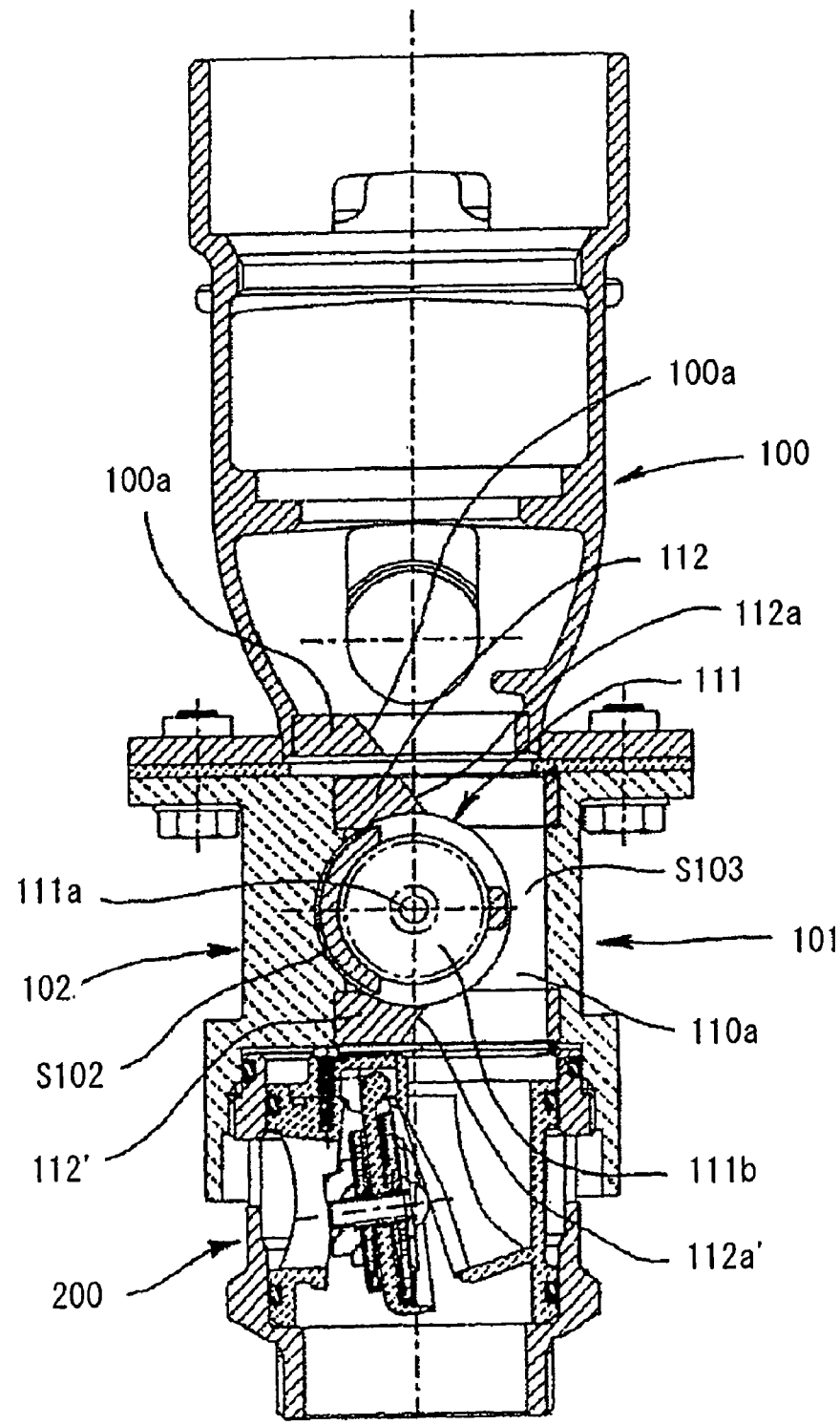
FIG. 12 is a front cross-sectional view showing a power generating unit for an indoor facility which constitutes a water supply apparatus of the present invention.
Figure 13:
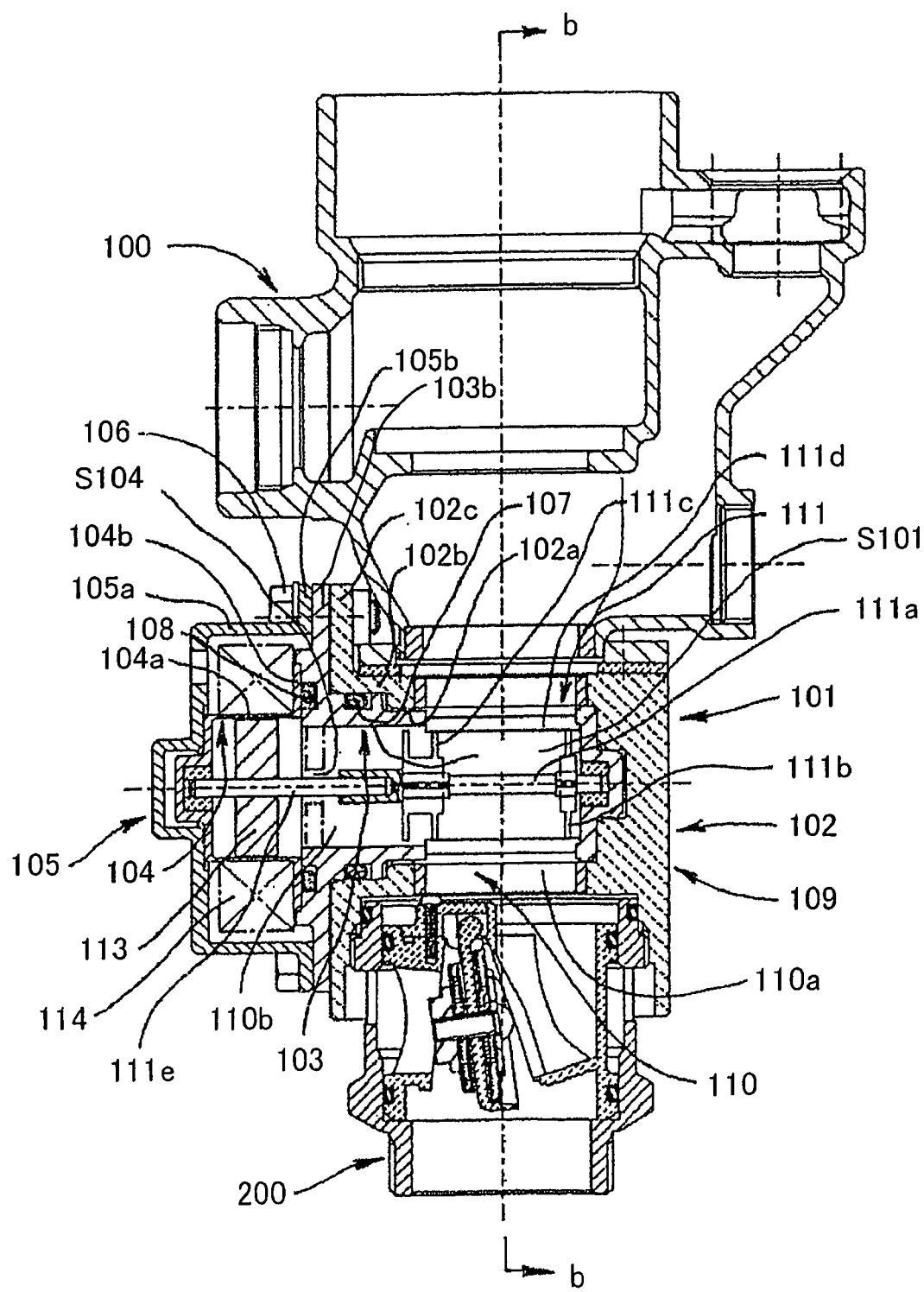
FIG. 13 is a side cross-sectional view showing the power generating unit for an indoor facility.

FIG. 12 and FIG. 13 show a power generating unit 101 for an indoor facility which constitutes the water supply apparatus according to the present invention. The power generating unit 101 for an indoor facility is configure to be directly connected to a midst portion of a serve water pipe.

As shown in FIG. 12 and FIG. 13, the power generating unit 101 for an indoor facility includes a first casing 102 having a straight cylindrical shape which forms an opening 102a in a center portion of a side wall thereof, wherein a cylindrical portion 102b extends in the outward radial direction from the opening 102a, and an outer flange 102c is formed on an end portion of the cylindrical portion 102b.

Further, the power generating unit 101 for an indoor facility includes a second casing 103 which has a cylindrical portion 103a and an outer flange 103b which is formed on one end of the cylindrical portion 103a, wherein the cylindrical portion 103a is inserted into the cylindrical portion 102b. Further, the cylindrical portion 103a is brought into contact with the cylindrical portion 102b, while the outer flange 103b is brought into contact with the outer flange 102c.

Further, the power generating unit 101 for an indoor facility includes a third casing 104 which has a bottomed cylindrical portion 104a and an outer flange 104b which is formed on an open end of the bottomed cylindrical portion 104a, wherein an inner space of the bottomed cylindrical portion 104a is communicated with an inner space of the cylindrical portion 103a and the outer flange 104b is brought into contact with the outer flange 103b.

Further, the power generating unit 101 for an indoor facility includes a cap 105 which has a bottomed cylindrical portion 105a and an outer flange 105b which is formed on an open end of the bottomed cylindrical portion 105a, wherein the cap 105 houses the third casing 104. Further, the outer flange 105b is brought into contact with the outer flange 103b and these outer flanges 103b, 105b are fixed to the outer flange 102c by bolts 106.

Further, the second casing 103 is clamped between the outer flange 102c of the first casing 102 and the outer flange 105b of the cap 105 and hence, the second casing 103 is fixed to the first casing 102. Further, the third casing 104 is clamped between the outer flange 103b of the second casing 103 and the bottom portion of the cap 105 and hence, the third casing 103 is fixed to the second casing 103.

Further, a contact portion between the cylindrical portion 102b and the cylindrical portion 103a is sealed by an O-ring 107, while a contact portion between the outer flange 103b and the outer flange 104b is sealed by an O-ring 108.

Further, the first casing 102, the second casing 103 and the third casing 104 are integrally assembled thus forming a casing 109.

Further, a flow passage 110 is formed of a main flow passage 110a extending approximately upright which is formed in the inside of the first casing 102 and a chamber 110b which is formed in the inside of the second casing 103 and in the inside of the third casing 104 and is branched from the main flow passage 110a and extends in the radial outward direction.

The impeller 111 is arranged in the inside of the main flow passage 110a.

A rotary shaft 111a of the impeller 111 is extended in the direction orthogonal to the extending direction (water flow direction) of the main flow passage 110a. Disc-like end plates 111b, 111c are fixed to both ends of the rotating shaft 111a in a state that the end plates 111b, 111c are spaced apart from each other. A plurality of rectangular plate-like curved blades 111d are arranged in a state that the blades 111d are extended from the peripheral portion of the end plate 111b to the peripheral portion of the end plate 111c and in a circumferentially spaced-apart manner. Both ends of the curved blades 111d are fixed to the end plate 111b and the end plate 111c.

A clearance S101 is formed between the curved blades 111d and the rotating shaft 111a.

Further, the rotating shaft 111a of the impeller 111 is offset in the radial and outward direction from a center axis of the main flow passage 110a immediately upstream of the impeller 111 with respect to the water flow. Accordingly, a clearance S102 between a side wall of the first casing 102 and the curved blades 111d in the offset direction of the rotating shaft 111a is narrow, while a clearance S103 between the side wall of the first casing 102 and the curved blades 111d in the direction opposite to the offset direction of the rotating shaft 111a is wide.

A guide member 112 is inserted into and fixed to an upstream-side end portion of the main flow passage 110a and to the narrow-width gap S102 side in a state that the guide member 112 approaches the impeller 111. Further, an oblique surface 112a which extends toward the large-width gap S103 from the upstream side is formed in the guide member 112. Further, the oblique surface 112a extends toward the large-width gap S103 after getting over the position right above the impeller rotating shaft 111a. Further, due to the provision of the guide member 112, the main flow passage 110a is squeezed at the immediately upstream of the impeller 111.

On the other hand, a guide member 112' is inserted into and fixed to an downstream-side end portion of the main flow passage 110a and to the narrow-width gap S102 side in a state that the guide member 112' approaches the impeller 111. Further, an oblique surface 112a' which extends toward the large-width gap S103 from the downstream side is formed in the guide member 112'. Further, the oblique surface 112a' extends toward the large-width gap S103 after getting over the position right below the rotating shaft 111a of the impeller 111.

Further, the rotating shaft 111a of the impeller 111 is offset in the radial outward direction from the center axis of the main flow passage 110a and the guide members 12, 12' are arranged and hence, with respect to the water flow of the main flow passage 110a, an immediately upstream portion and an immediately downstream portion of the impeller 111 are directed toward an outer peripheral portion of the impeller 111 and the large-width gap S103.

Further, the rotating shaft 111e which is fixed to the end plate 111c extends coaxially with the rotating shaft 111a in the inside of the chamber 110b. To a portion of the rotating shaft 111e which extends in the inside of the bottomed cylindrical portion 104a of the third casing 104, an annular magnet 113 which has a plurality of magnetic poles in the circumferential direction in a spaced apart manner is fixed. The magnet 113 is designed such that the radial outer end portion of the magnet 113 alternately and circumferentially repeats the N pole and the S pole.

Further, an end portion of the rotating shaft 111a at an end plate 111b side and an end portion of the rotating shaft 111a at a magnet 113 side are respectively supported by bearings.

Further, a coil 114 is disposed outside the third casing 104, that is, in the inside of the cap 105 in a state that the coil 114 wraps a bottomed cylindrical portion 104a of the third casing 104. The coil 114 faces the magnet 113 while sandwiching the bottomed cylindrical portion 104a therebetween thus allowing a magnetic flux of the magnet 113 to pass the coil 114.

The above-mentioned power generating unit 101 for an indoor facility having the above-mentioned constitution is interposed between a faucet 100 for an indoor facility which is turned on to allow a water flow to flow upon the energizing of an electromagnetic valve not shown in the drawing and automatically stops the water flow after a lapse of a given time based on trigger signals from various sensors such as a human body detection sensor, a waste detection sensor, an odor sensor and the like, and a vacuum breaker 200 which is arranged downstream of the faucet 100 for an indoor facility. That is, one end portion of the first casing 102 in which a guide member 112 is inserted is connected to the downstream side of the faucet 100 for an indoor facility by way of a flange, while another end of the first casing 102 is connected to the upstream end of the vacuum breaker 200. The guide member 100a having an oblique surface 100a' which is connected with an oblique surface 112a of the guide member 112 on a coplanar plane is inserted into and fixed to a downstream end of the faucet 100 for an indoor facility.

The casing 109 of the power generating unit 101 for an indoor facility forms a portion of a service water pipe, while the vacuum breaker 200 is connected with a flushing toilet bowl not shown in the drawing by way of a pipe not shown in the drawing.

Next, the manner of operation of the power generating unit 101 for an indoor facility having the above-mentioned constitution is explained.

In the faucet 100 for an indoor facility, the electromagnetic valve which is not shown in the drawing is energized and hence, a water flow which is allowed to flow upon actuation of the electromagnetic valve flows into the main flow passage 110a of the power generating unit 101 for an indoor facility while being guided by the oblique surface 100a' of the guide member 100a. The water flow is directed toward an outer peripheral portion of the impeller 111 and also is directed toward the large-width clearance S103 while being guided by the oblique surface 112a of the guide member 112 which is connected with the oblique surface 100a' on a coplanar plane The water flow which flows into the outer peripheral portion of the impeller 111 impinges on the curved blades 111d on the large-width clearance S103 side and rotatably drives the impeller 111. The impeller 111 rotatably drives the magnet 113.

Then, due to a change of the magnetic flux of the magnet 113 which passes through the coil 114, an electromotive force is generated in the coil 114. The power generated in the coil 114 is, directly or after being stored in a secondary cell or a capacitor, utilized as a portion of drive power for the electromagnetic valve which is not shown in the drawing provided to the faucet 100 for an indoor facility or utilized as a portion of drive power for various kinds of sensors, a portion of drive power of various kinds of control circuits, a portion of drive power of various kinds of functional members such as a lamp or an electrolytic vessel which are provided to the indoor facility.

Further, the water flow which rotatably drives the impeller 111 flows out from the outer periphery of the impeller 111 and, flows into a vacuum breaker 200 from the power generating unit 101 for an indoor facility through the main flow passage 110a, flows into the flushing toilet bowl which is not shown in the drawing, and is served for discharging a waste in the toilet bowl from the toilet bowl.

In the power generating unit 101 for an indoor facility having the above-mentioned constitution, the magnet 113 which is rotatably driven by the impeller 111 is arranged in the inside of the flow passage 110 and the coil 114 which faces the magnet 113 is arranged outside the flow passage 110. Accordingly, it is unnecessary to allow one end of the rotary shaft 111e of the impeller 111 to penetrate the surrounding wall of the flow passage 110 and to extend toward the outside of the flow passage 110 and it is also unnecessary to provide a slide contact portion between the rotary shaft 111e and a sealing member. As a result, it is possible to suppress the leaking of water to the outside of the flow passage 110 thus suppressing a phenomenon that the coil 114 is splashed with water.

Further, in the main flow passage 110a, a portion immediately upstream of the impeller 111 and a portion immediately downstream of the impeller 111 with respect to the water flow are directed toward the outer periphery of the impeller 111 and hence, the water flow flows into the outer periphery of the impeller and flows out from the outer periphery. As a result, the water flow in the direction of the rotary shaft 111a of the impeller 111 is largely suppressed, and the water flow in the direction of the magnet 113 which is engaged with the rotary shaft 111a of the impeller 111 is also largely suppressed and hence, the phenomenon that the magnet 113 is splashed with water can be largely suppressed, and the erosion of the magnet 113 and the adhesion of foreign substances to the magnet 113 are largely suppressed.

Further, in the power generating unit 101 for an indoor facility, since the main flow passage 110a in the vicinity of the impeller 111 extends approximately straightly, the bending of the water flow is suppressed whereby the pressure loss is suppressed.

Further, in the power generating unit 101 for an indoor facility, the rotary shaft 111a of the impeller 111 is offset from the center axis of the main flow passage 110a immediately upstream of the impeller 111 in the outward radial direction with respect to the water flow and, the large-width clearance S103 is formed between the outer periphery of the impeller 111 on a side opposite to the above-mentioned offset direction and a surrounding wall of the main flow passage 110a which faces the outer periphery and, further, the main flow passage 110a immediately upstream of the impeller 111 is directed toward the outer peripheral portion of the impeller 111 and toward the large-width clearance S103. Accordingly, only the water flow which is necessary for generating the power is introduced to the impeller 111 and, on the other hand, the remaining water flow is introduced to the large-width clearance S103 and hence, the generation of undesired pressure loss is suppressed.

Further, in the power generating unit 101 for an indoor facility, since the clearance S101 is formed between the curved blades 111d and the rotary shaft 111a of the impeller 111, a state that the water flow dwells above the curved blade 111d is suppressed and hence, the rotation resistance of the impeller 111 is suppressed whereby the pressure loss attributed to the impeller 111 is suppressed.

Further, in the power generating unit 101 for an indoor facility, the main stream passage 110a is squeezed at the immediately upstream of the impeller 111 and hence, a flow speed of the water flow which impinges on the impeller 111 is increased thus enhancing the power generation efficiency.

Further, in the power generating unit 101 for an indoor facility, by fixing the magnet 113 to the rotary shaft 111e of the impeller 111, the power transmission loss which occurs when the power is transmitted from the rotary shaft 111e to the magnet 113 is suppressed and hence, the power generation efficiency is enhanced. Further, since a power transmission mechanism is not interposed between the rotary shaft 111e and the magnet 113, the power generating unit 101 for an indoor facility can be miniaturized.

Further, in the power generating unit 101 for an indoor facility, since the casing 109 is configured to form a portion of the water pipe, by incorporating or assembling the power generating unit 101 for an indoor facility into the service water pipe, it is possible to easily perform the power generation and to convert the hydraulic energy which has been wasted into the electric energy efficiently.

Further, in the power generating unit 101 for an indoor facility, the water flow is directed toward the outer peripheral portion of the impeller 111, and hence a torque which the water flow applies to the impeller 111 can be increased.

Accordingly, the power generating unit 101 for an indoor facility quickly rises at the time of starting and hence, it is possible to start the power generation immediately after the water flow is allowed to flow. Further, when the power generating unit 101 for an indoor facility is combined with the faucet 100 for an indoor facility which allows the water flow to flow in response to the energizing of the electromagnetic valve not shown in the drawing and automatically stops the water flow after the lapse of a given time, the power generating unit 101 for an indoor facility can surely generate power within a given time from the point of time that the water flow is allowed to flow to the point of time that the water flow is stopped.

Accordingly, even when the time from the point of time that the water flow is allowed to flow to the point of time that the water flow is stopped is short, to be more specific, even when the time is equal to or less than 1 minute, the power generating unit 101 for an indoor facility can efficiently generate power and supply at least a portion of drive power for the above-mentioned electromagnetic valve.

Further, in the power generating unit 101 for an indoor facility, since the water flow which is directed toward the outer peripheral portion of the impeller 111 efficiently applies a force to the blades 111d in the vicinity of the outer periphery having a large peripheral speed and hence, the pressure loss attributed to the impeller 111 is small. Further, a large-width clearance S103 is formed close to the outer peripheral portion of the impeller 111 and the clearance S101 is formed between the rotary shaft 111a and the blades 111d of the impeller 111 and hence, the flow resistance of the impeller 111 is small, the rotary resistance is small and the pressure loss attributed to the impeller 111 is small. Accordingly, it is possible to allow the water flow on the downstream side of the impeller 111 to have a water pressure necessary for waste transfer, specifically, a water pressure equal to or more than 0.02 MPa.

Further, in the power generating unit 101 for an indoor facility, functional members such as the main flow passage 110a, the impeller 111, the magnet 113 and the coil 114 are designed such that a valve volume coefficient Cv which is expressed by a following formula (1) satisfies a formula (2).

$$Cv = (N \times Q)/\sqrt{(\Delta P)} \quad (1)$$

$$Cv \geq 0.1267 \times Q \quad (2)$$

Here, N is 0.0219, Q is a flow rate (L/minute) of the water flow which flows in the power generating unit for an indoor facility, $\Delta P$ (MPa) is the pressure loss of the power generating unit for an indoor facility.

The valve volume coefficient Cv expressed by the formula (1) is a constant which defines the relationship between the pressure difference $\Delta P$ between an inlet and an outlet of the valve and the flow rate of fluid which flows through the valve. The valve volume coefficient Cv is the constant which is defined by a shape and a size of the valve.

Here, when the valve volume coefficient satisfies the formula (2), the relationship $\Delta P \leq 0.03$ MPa is established. Assuming the power generating unit for an indoor facility 1 as a type of valve, when the valve volume coefficient Cv of the power generating unit 101 for an indoor facility satisfies the formula (2), the pressure loss $\Delta P$ of the power generating unit for an indoor facility 1 becomes equal to or less than 0.03 MPa. Since the terminal water pressure of the water pipe to which the indoor facility is connected is generally equal to or more than 0.05 MPa, provided that the valve volume coefficient Cv of the power generating unit 101 for an indoor facility satisfies the formula (2), it is possible to allow the water flow on the downstream side of the power generating unit 101 for an indoor facility to have the water pressure equal to or more than 0.02 MPa which is necessary for the waste transfer.

The power generating unit 101 for an indoor facility in which the valve volume coefficient Cv satisfies the formula (2) is suitably combined with an indoor facility having the relatively small flow rate or an indoor facility which can be driven under the low pressure. Specifically, the power generating unit 101 for an indoor facility is suitably combined with an indoor facility such as a bathroom faucet, a wash-basin faucet, a kitchen faucet, a tank-equipped toilet bowl or a urinal, or a human part cleaning device.

Further, when the valve volume coefficient Cv of the power generating unit 101 for an indoor facility satisfies a following formula (3), the pressure loss ΔP of the power generating unit 101 for an indoor facility becomes equal to or less than 0.02 MPa and hence, it is possible to allow the water flow on the downstream side of the power generating unit 101 for an indoor facility to have the water pressure equal to or more than 0.03 MPa.

$$Cv \geqq 0.155 \times Q \tag{3}$$

The power generating unit 101 for an indoor facility in which the valve volume coefficient Cv satisfies the formula (3) is also suitably combined with a service-water direct-pressure type toilet bowl or a urinal, a bath-room shower, a bubble-mixing type wash-basin faucet or kitchen faucet in addition to the above-mentioned indoor facilities.

Further, when the valve volume coefficient Cv of the power generating unit 101 for an indoor facility satisfies a following formula (4), the pressure loss ΔP of the power generating unit 101 for an indoor facility becomes equal to or less than 0.01 MPa and hence, it is possible to allow the water flow on the downstream side of the power generating unit 101 for an indoor facility to have the water pressure equal to or more than 0.04 MPa.

$$Cv \geqq 0.2194 \times Q \tag{4}$$

The power generating unit 101 for an indoor facility in which the valve volume coefficient Cv satisfies the formula (4) is also suitably combined with an indoor facility which has a relatively large flow rate and requires a high pressure to drive in addition to the above-mentioned indoor facilities.

In the power generating unit 101 for an indoor facility, as shown by a chain line in FIG. 13, an outer flange 103b of a second casing 103 may be extended in the inward radial direction thus forming a squeezed portion S104 between the main flow passage 110a which incorporates the impeller 111 therein and a portion of the chamber 110b which incorporates the magnet 113 therein.

In this case, the intrusion of water to the vicinity of the magnet 113 is suppressed and the splashing of water to the magnet 113 is suppressed and the erosion of the magnet 113 or the adhesion of foreign substances on the magnet 113 is suppressed.

Further, it is possible to replace the extending portion of the outer flange 103b in the above-mentioned inward radial direction with a net.

In this case also, the intrusion of water to the vicinity of the magnet 113 is suppressed and the splashing of water to the magnet 113 is suppressed and the erosion of the magnet 113 or the adhesion of foreign substances on the magnet 113 is suppressed.

Figure 14:
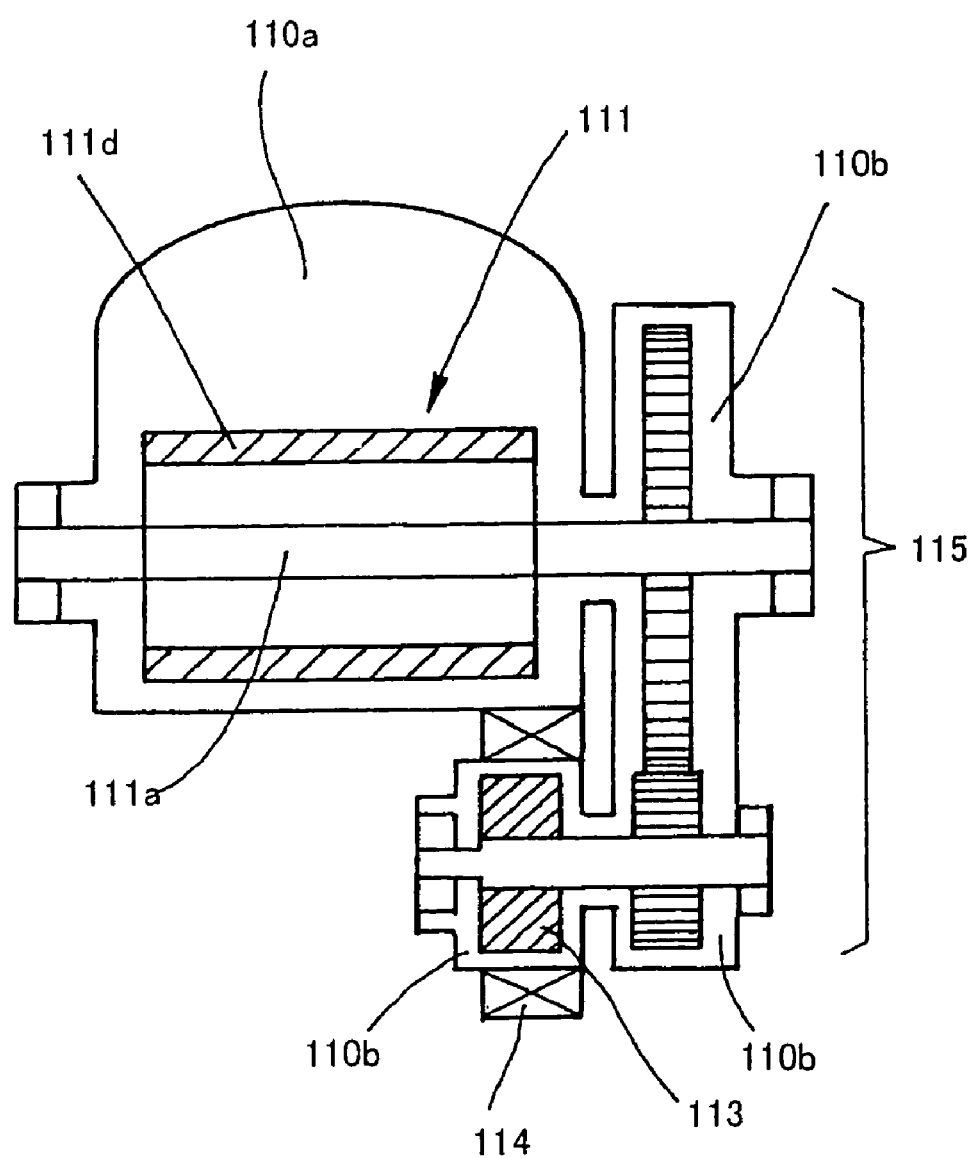
FIG. 14 is a schematic view showing another power generating unit for an indoor facility.

Further, in the power generating unit 101 for an indoor facility, as shown in FIG. 14, it is possible to dispose a transmission 115 in the inside of the chamber 110b and to engage the magnet 113 with the impeller 111 by way of the transmission 115.

Figure 15:
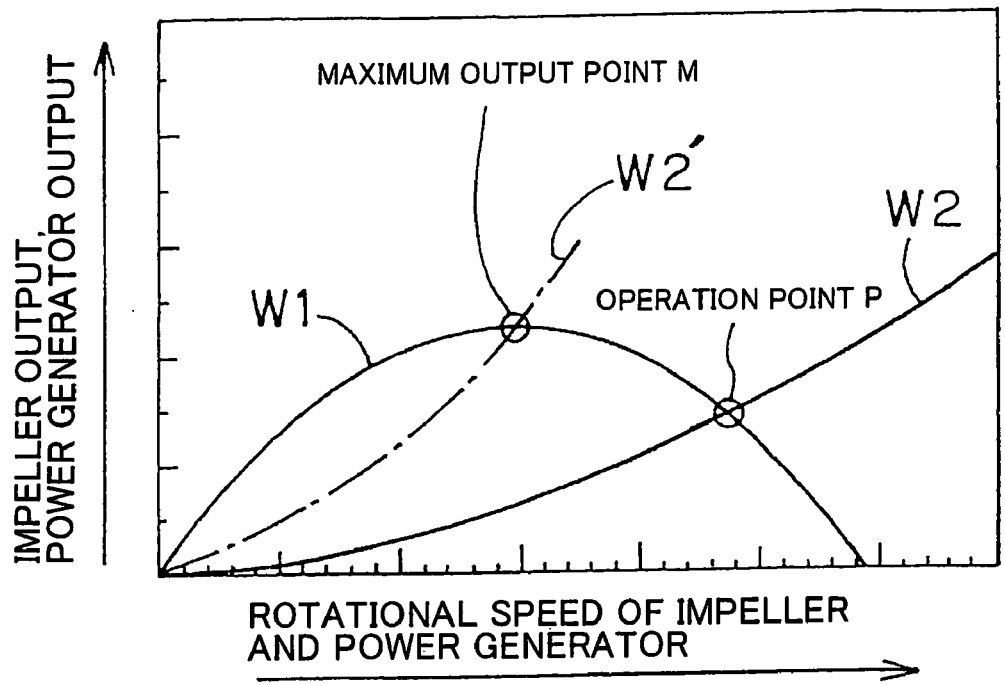
FIG. 15 is a graph showing the output characteristics of an impeller.

In the power generating unit 101 for an indoor facility, an output characteristics W1 of the impeller 111 and an input characteristics W2 of the power generator formed with the magnet 113 and the coil 114 are generally as shown in FIG. 15.

Accordingly, when the impeller 111 and the above-mentioned power generator are connected, the power generator is operated at a point at which the output of the impeller 111 and the input of the power generator are balanced, that is, a crossing point P of W1 and W2.

Here, by engaging the magnet 113 with the impeller 111 by way of the transmission 115 and by moving the input characteristics W2' of the power generator based on rotational speed of the impeller 111 leftward as shown by a chain line in FIG. 15, it is possible to move the crossing point of W1 and W2' and, furthermore, the operation point of the power generator to a maximum output point M of the impeller 111.

Since the output of the power generator is increased or decreased corresponding to the increase or the decrease of the input of the power generator, by moving the operation point of the power generator to the maximum output point M of the impeller 111, the power generator is driven with the maximum output of the impeller 111 and hence, it is possible to acquire the maximum output from the power generator. As a result, the power generating efficiency of the power generating unit 101 for an indoor facility is enhanced. Further, it is possible to change an electric power output of the power generating unit 101 for an indoor facility when necessary without changing the designing of the main flow passage 110a, the impeller 111, the magnet 113 and the coil 114.

The number of curved blades 111d of the impeller 111 is favorably equal to or more than 4 and equal to or less than 20. This is because that, since energy which one curved blade 111d receives from the water flow is limited, when the number of curved blades 111d is less than 4, it is difficult to receive the sufficient energy for power generation from the water flow. On the other hand, another reason is that, when the number of the curved blades 111d is more than 20, an interval between the blades in the circumferential direction becomes small and hence, the flow resistance is increased whereby the energy acquisition efficiency is lowered.

Figure 16:
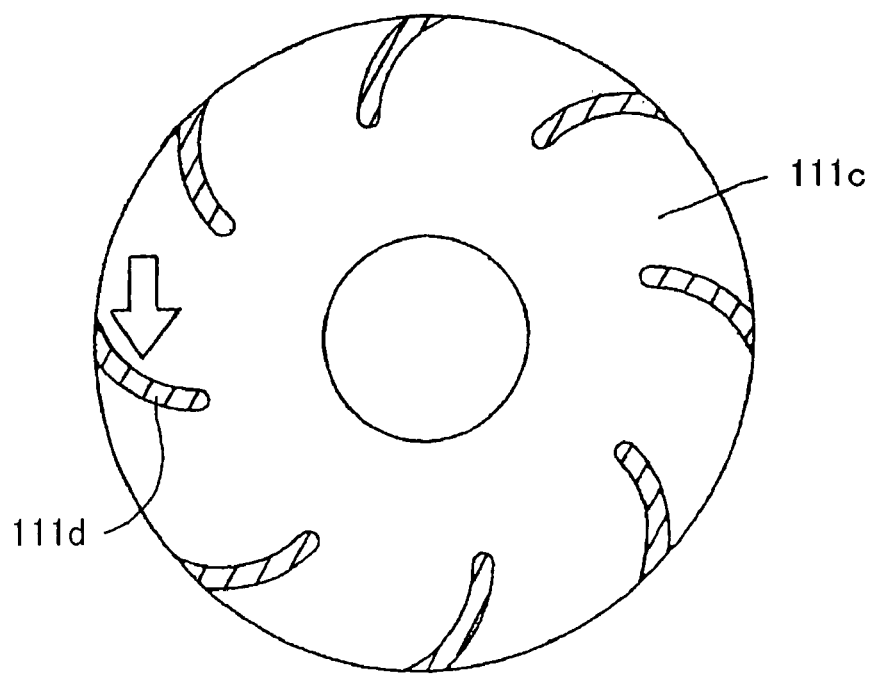
FIG. 16 is a cross-sectional view showing an impeller.

As shown in FIG. 16, the cross-sectional shape of the curved blades 111d of the impeller 111 is favorably a curve protruding in the water flow direction as shown by a white-matted arrow. The energy acquisition efficiency with the curved blades is higher than the energy acquisition efficiency with planar blades.

Further, when the power generating unit 101 for an indoor facility is used in combination with an indoor facility having relatively small flow rate or an indoor facility which can be driven under low pressure or when necessary in arranging a flow passage, it is possible to curve the main flow passage 110a in the vicinity of the impeller 111 along the outer periphery of the impeller 111. Further, it is possible to arrange the power generating unit 101 for an indoor facility at the upstream of the faucet 100 for an indoor facility. Further, it is possible to omit the vacuum breaker 200.

Figure 17:
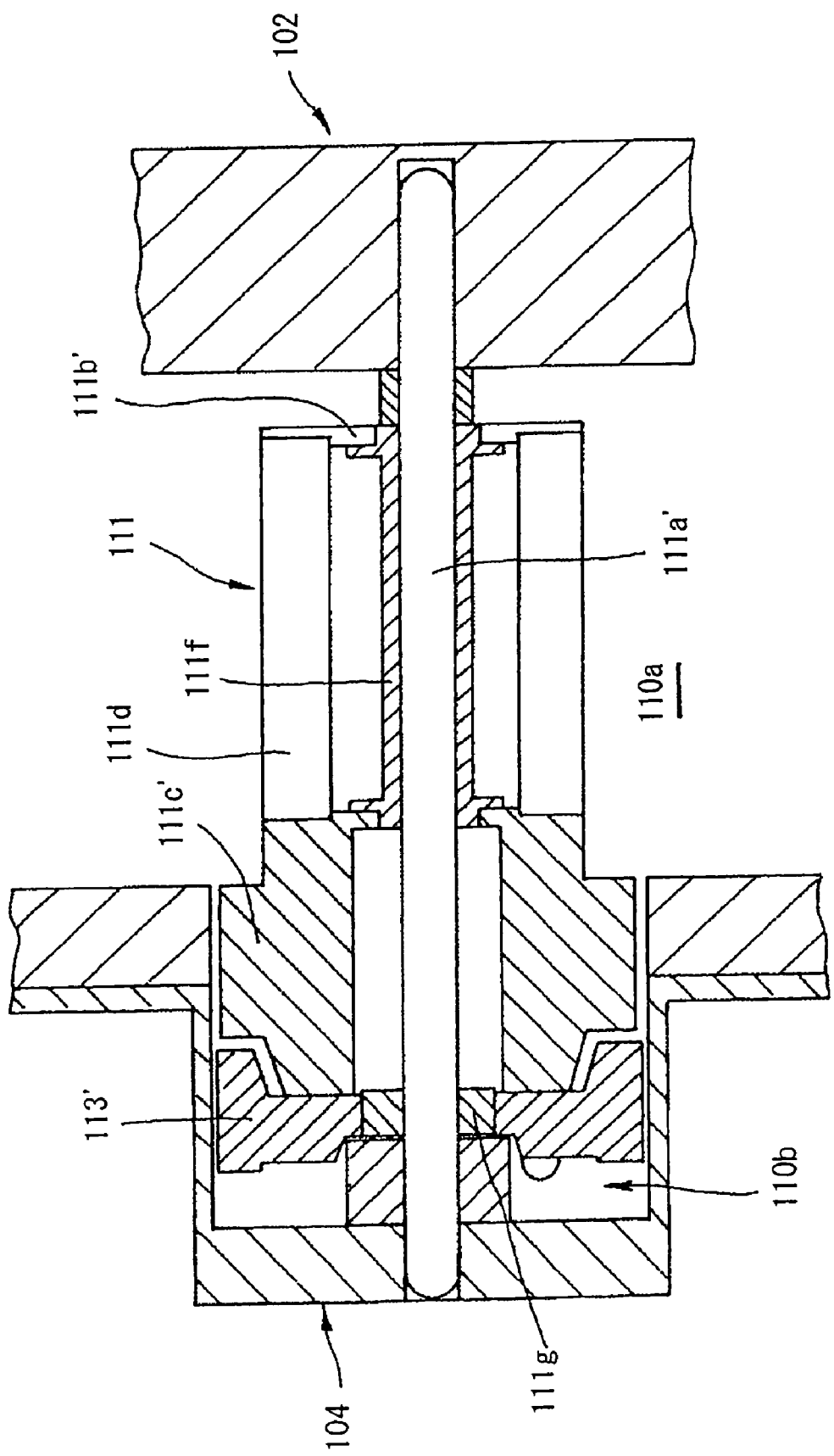
FIG. 17 is a cross-sectional view showing another power generating unit for an indoor facility.

As shown in FIG. 17, it is possible that the rotary shaft 111a and the rotary shaft 111e of the impeller 111 are integrated to form a rotary shaft 111a', one end of the rotary shaft 111a' is fixed to the first casing 102 and another end of the rotary shaft 111a' is fixed to the third casing 104, a boss 111f which is fitted in a rotatable and slidable manner on the rotary shaft 111a' is provided, an end plate 111b' is fixed to one end of the boss 111f while an end plate 111c' is fixed to another end of the boss 111f and the magnet 113' is fixed to the end plate 111c'. A bearing 111g is arranged between the magnet 113' and the rotary shaft 111a'. In this case, the curved blades 111d are rotated around the rotary shaft 111a' and the magnet 113' is rotated along with the rotation of the curved blades 111d.

INDUSTRIAL APPLICABILITY

The water supply apparatus according to the present invention is constituted by disposing the apparatus body in the midst of the flow passage for supplying water to the indoor facility and by installing the power generating unit in the apparatus body.

Further, the power generating unit includes the rotating shaft extended in the direction orthogonal to the water flow direction of the flow passage, the impeller mounted on the rotating shaft and rotated by the water flow, the magnet rotated interlockingly with the impeller, and the coil arranged to face the magnet in the opposed manner, wherein the impeller forms blades in the outward radial direction and forms clearances allowing water to pass the inside of the blades.

In the power generating unit according to the present invention, water which flows in the flow passage impinges on the distal end portions of the blades so as to rotate the impeller, and the magnet is interlockingly rotated whereby the power generation is performed due to the cooperative action of the magnet and the coil.

Further, in such an operation, water which impinges on the distal end portions of the blades, thereafter, flows not only toward the outside than the distal end of the blades but also toward the proximal end portion of the blades. However, water which flows into the proximal end portion of the blades passes through the clearance which is formed in the inner portions of the blades and is smoothly discharged from the impeller.

In this manner, in the present invention, since the clearance is formed between the blade and the rotary shaft, the possibility that water which flows toward the proximal end portions of the blades obstructs the rotation of the impeller can be eliminated whereby the power generation amount due to the power generating unit can be increased.

Further, in the present invention, it is unnecessary to expand the flow passage outside the impeller for reducing the rotational resistance of the impeller whereby the water supply apparatus can be miniaturized.

Further, the power generating unit according to the present invention is inserted into the apparatus body from the opening portion formed in the apparatus body in a state that the distal end portion thereof is supported in the inside of the apparatus body.

Accordingly, the power generating unit can be easily mounted or dismounted from the apparatus body and hence, the assembling property of the water supply apparatus can be enhanced and, at the same time, the maintenance property of the power generating unit can be enhanced.

Further, since the distal end portion of the power generating unit is supported in the inside of the apparatus body, it is possible to assemble the power generating unit to the apparatus body in a stable manner whereby the rotating shaft can be accurately arrange in place in the flow passage of the apparatus body.

Further, in the power generating unit according to the present invention, while the magnet is arranged in the inside of the flow passage, the coil is arranged outside the flow passage which is hermetically partitioned from the flow passage and hence, there is no possibility that the coil is immersed in water whereby it is possible to prevent erroneous operations and troubles of the power generating unit attributed to the erosion and the short-circuiting of the coil in advance.

Further, the power generating unit according to the present invention includes the intrusion suppression means which prevents the intrusion of the foreign substance such as iron rusts or the like between the blades and the magnet and hence, it is possible to suppress the adhesion of the iron rusts or the like to the magnet 43. Further, by forming the intrusion suppression means into the thread shape having the spear-headed distal ends, it is possible to suppress the clogging of the iron rusts or the like in the intrusion suppression means 57 and hence, erroneous operations and troubles of the power generating unit 23 attributed to the adhesion of the impeller 27 can be prevented in advance.

Particularly, since the intrusion suppression means according to the present invention is constituted of the spiral grooves which are spirally formed on the outer periphery of the impeller in a state that the groove forming direction is opposite to the rotational direction of the impeller, it is possible to easily form the intrusion suppression means between the blades and the magnet.

Further, according to the present invention, since the power generating unit is arranged on the center line of the water inlet port formed in the apparatus body, irrespective of the direction of the water supply pipe which is connected to the water inlet port, it is possible to favorably mount the power generating unit on the apparatus body whereby the installation property of the toilet bowl flushing device can be enhanced.

Further, according to the present invention, since the clearance is formed between the outer peripheries of the blades and the inner wall of the flow passage, it is possible to allow a portion of water which flows in the flow passage to flow out through the clearance between the outer peripheries of the blades and the inner wall of the flow passage whereby the pressure loss in the flow passage can be suppressed.

Further, in the power generating unit according to the present invention, since the cylindrical portion is formed along the outer peripheries of the blades, it is possible to accurately regulate an amount or an inflow angle of water which rotates the blades by impingement on the blades by changing the shape of the cylindrical portion whereby it is possible to obtain the desired power generation amount using the power generating unit.

Further, according to the present invention, the guide member which guides water toward the impeller is contiguously formed with the cylindrical portion and hence, it is possible to accurately regulate an amount of water which flows in the cylindrical portion whereby it is possible to obtain the desired power generation amount using the power generating unit Further, according to the present invention, since the guide member which guides water toward the impeller is provided at the position where the guide member faces the cylindrical portion with the rotating shaft therebetween, the impeller is rotated with water which flows in through the clearance between the cylindrical portion and the guide member whereby the power can be surely generated using the power generating unit with a small water quantity.

The invention claimed is:

1. A water supply apparatus in which an apparatus body is disposed in a midst of a flow passage for supplying water to an indoor facility and a power generating unit is installed in the apparatus body, the power generating unit comprising;
   a rotating shaft extended in the direction perpendicular to the water flow direction of the flow passage;
   an impeller mounted on the rotating shaft and rotated by a water flow;

a holder having a cylindrical portion with an arcuate cross section along the impeller and having a shaft support portion which supports a proximal end portion of the rotary shaft on a distal end portion of the cylindrical portion;

a magnet rotated interlockingly with the impeller; and a coil arranged to face the magnet in an opposed manner wherein the holder in the power generating unit is mounted on a peripheral surface of an opening portion formed in the apparatus body in a state that the shaft support portion is inserted into the inside of the flow passage from the opening portion, the impeller forms blades in the outward radial direction and forms clearances allowing water to pass the inside of the blades;

a clearance is formed between outer peripheries of the blades and an inner wall of the flow passage, and the clearance is set larger than a clearance between the outer peripheries of the blades and the cylindrical portion for forming a flow passage which does not receive a pressure loss attributed to the impeller.

2. A water supply apparatus according to claim 1, wherein the holder of the power generating unit has a distal end portion thereof supported in a state tat the distal end is fitted in an inner surface of the apparatus body which faces the opening portion in an opposed manner.

3. A water supply apparatus according to claim 1 or 2, wherein the power generating unit includes intrusion suppression means which suppresses the intrusion of foreign substances between the blades and the magnet.

4. A water supply apparatus according to claim 3, wherein the intrusion suppression means is constituted by forming spear-headed thread-like grooves capable of generating water flow which pushes back the foreign substance to the blade side due to the rotation of the impeller on an outer periphery of the impeller.

5. A water supply apparatus according to claim 1 or 2, wherein a guide member which guides water toward the impeller is formed above the cylindrical portion.

6. A water supply apparatus according to claim 5, wherein a second guide member which guides water toward the impeller is arranged at a position where the second guide member faces the guide member in an opposed manner with the rotary shaft sandwiched therebetween.

7. A water supply apparatus according to claim 1 or claim 2, wherein in the power generating unit, the magnet is disposed inside the flow passage and the coil is disposed outside the flow passage in a hermetically partitioned manner from the flow passage.

8. A water supply apparatus according to claim 1 or 2, wherein the power generating unit arranges the rotating shaft on a center axis of the flow passage.

9. A water supply apparatus according to claim 1 or 2, wherein clearances are formed between outer peripheries of the blades and an inner wall of the flow passage in a state that the clearances are arranged asymmetrical with respect to an axis of the rotating shaft.

10. A water supply apparatus comprising:

an apparatus body disposed in a water supply flow passage;

a power generating unit removably disposed in the apparatus body, the power generating unit comprising:

a holder having an axial proximal end and an axial distal end;

said holder including an axially extending cylindrical portion and a cover, said cylindrical portion extending from said holder distal end towards said holder proximal end, and said cover extending from said holder proximal end towards said holder distal end, said cylindrical portion including an axial opening;

a rotating shaft rotatably supported at said axial distal end of said holder cylindrical portion in essentially a radial center of said cylindrical portion, said shaft axially extending towards said holder cover;

said holder being removably mounted on a peripheral surface of an opening in the apparatus body so that: said cover is disposed exterior to said body and said cylindrical portion is disposed within said body and extends perpendicularly through a water flow path; and water flow is capable of flowing over an exterior surface of said cylindrical portion and into an interior of said cylindrical portion through said axial opening;

an impeller disposed within the cylindrical portion of the holder and disposed on the rotating shaft, the impeller being rotatable by the water flow entering the interior of said cylindrical portion;

a magnet disposed within the holder and connected to the impeller so as to rotate with the impeller; and a coil disposed in said cover of the holder and facing the magnet; and the impeller including blades extending in a radially outward direction and including clearances for enabling water flow past the blades.

11. The water supply apparatus of claim 10, wherein to power generating unit includes intrusion suppression means for suppressing the intrusion of foreign substances between the blades and the magnet.

12. The water supply apparatus of claim 11, wherein the intrusion suppression means comprises spear-headed thread-like grooves capable of generating water flow for moving the foreign substance toward the impeller blades from rotation of the impeller on an outer periphery of the impeller.

13. The water supply apparatus of claim 10, wherein a guide member for guiding water toward the impeller is disposed above the cylindrical portion.

14. The water supply apparatus of claim 13, wherein the guide member is a first guide member, the apparatus further comprising a second guide member which guides water toward the impeller is arranged at a position where the second guide member faces the first guide member in an opposed manner with the rotary shaft sandwiched therebetween.

15. The water supply apparatus of claim 10, wherein in the power generating unit, the magnet is disposed inside the flow passage and the coil is disposed outside the flow passage, the coil and flow passage being separated by a hermetically sealed partition.

16. The water supply apparatus of claim 10, wherein the rotating shaft of the power generating unit is disposed on a center axis of the flow passage.

17. The water supply apparatus of claim 10, wherein the clearances are formed between outer peripheries of the blades and an inner wall of the flow passage so that the clearances are asymmetrically arranged with respect to an axis of the rotating shaft.

* * * * *